United States Patent
Maejima

(10) Patent No.: US 11,470,239 B2
(45) Date of Patent: Oct. 11, 2022

(54) ELECTRONIC DEVICE FOR RECEIVING LINE OF SIGHT INPUT, METHOD OF CONTROLLING ELECTRONIC DEVICE, AND NON-TRANSITORY COMPUTER READABLE MEDIUM

(71) Applicant: CANON KABUSHIKI KAISHA, Tokyo (JP)

(72) Inventor: Fumiaki Maejima, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 16/939,528

(22) Filed: Jul. 27, 2020

(65) Prior Publication Data
US 2021/0037189 A1    Feb. 4, 2021

(30) Foreign Application Priority Data
Jul. 31, 2019   (JP) .............................. JP2019-140739

(51) Int. Cl.
*H04N 5/232*    (2006.01)
*G06F 3/01*     (2006.01)
*G06F 3/0484*   (2022.01)

(52) U.S. Cl.
CPC ......... *H04N 5/23216* (2013.01); *G06F 3/013* (2013.01); *G06F 3/0484* (2013.01);
(Continued)

(58) Field of Classification Search
CPC .......... H04N 5/23216; H04N 5/232933; G06F 3/013; G06F 3/0484; G06F 3/04847;
(Continued)

(56) References Cited

U.S. PATENT DOCUMENTS 5,977,976 A * 11/1999 Maeda ................. H04N 5/772
                                                386/E5.072
6,538,697 B1 * 3/2003 Honda ............. H04N 5/232933
                                                348/333.03
(Continued)

FOREIGN PATENT DOCUMENTS

CN    104364747 A    2/2015
CN    105718043 A    6/2016
(Continued)

OTHER PUBLICATIONS

Jul. 26, 2022 Chinese Notice of Allowance, which is enclosed without an English Translation, that issued in Chinese Patent Application No. 202010745438.8.

*Primary Examiner* — John Villecco
(74) *Attorney, Agent, or Firm* — Cowan, Liebowitz & Latman, P.C.

(57) ABSTRACT

An electronic device comprising: a control unit configured to perform control such that, in case a first option group is displayed in a state incapable of receiving option selection by a line of sight input, the first option group is moved, and a second option group that includes a plurality of options including one or more options included in the first option group and one or more options not included in the first option group is displayed, in accordance with an operation on an operation member for selecting any one option of the first option group, and in case a third option group is displayed in a state capable of receiving the option selection by the line of sight input, any one option of the third option group is selected without moving the third option group, in accordance with the line of sight input.

18 Claims, 12 Drawing Sheets

(52) U.S. Cl.
CPC ... *H04N 5/23245* (2013.01); *H04N 5/232933* (2018.08); *H04N 5/232935* (2018.08)

(58) Field of Classification Search
CPC .... G06F 3/0488; G06F 3/0482; G06F 3/0485; G06F 3/04855
See application file for complete search history.

(56) References Cited

U.S. PATENT DOCUMENTS

| | | | |
|---|---|---|---|
| 11,108,945 B2* | 8/2021 | Ichikawa | G06F 3/013 |
| 11,122,207 B2* | 9/2021 | Miyajima | G06F 3/04842 |
| 11,233,941 B2* | 1/2022 | Ogawa | H04N 5/232945 |
| 2011/0197156 A1 | 8/2011 | Strait et al. | |
| 2015/0149945 A1 | 5/2015 | Izaki | |
| 2015/0324087 A1* | 11/2015 | Gregory | G06F 3/013 |
| | | | 345/174 |
| 2017/0060370 A1* | 3/2017 | Ahn | G06F 3/013 |
| 2020/0393898 A1* | 12/2020 | Ichikawa | G03B 13/02 |
| 2021/0058562 A1* | 2/2021 | Toguchi | H04N 5/23245 |
| 2021/0281733 A1* | 9/2021 | Yamanaka | H04N 5/23245 |
| 2021/0281768 A1* | 9/2021 | Sugie | H04N 5/23219 |

FOREIGN PATENT DOCUMENTS

| | | |
|---|---|---|
| CN | 106255940 A | 12/2016 |
| JP | 2009-251658 A | 10/2009 |
| JP | 2016-189226 A | 11/2016 |

\* cited by examiner

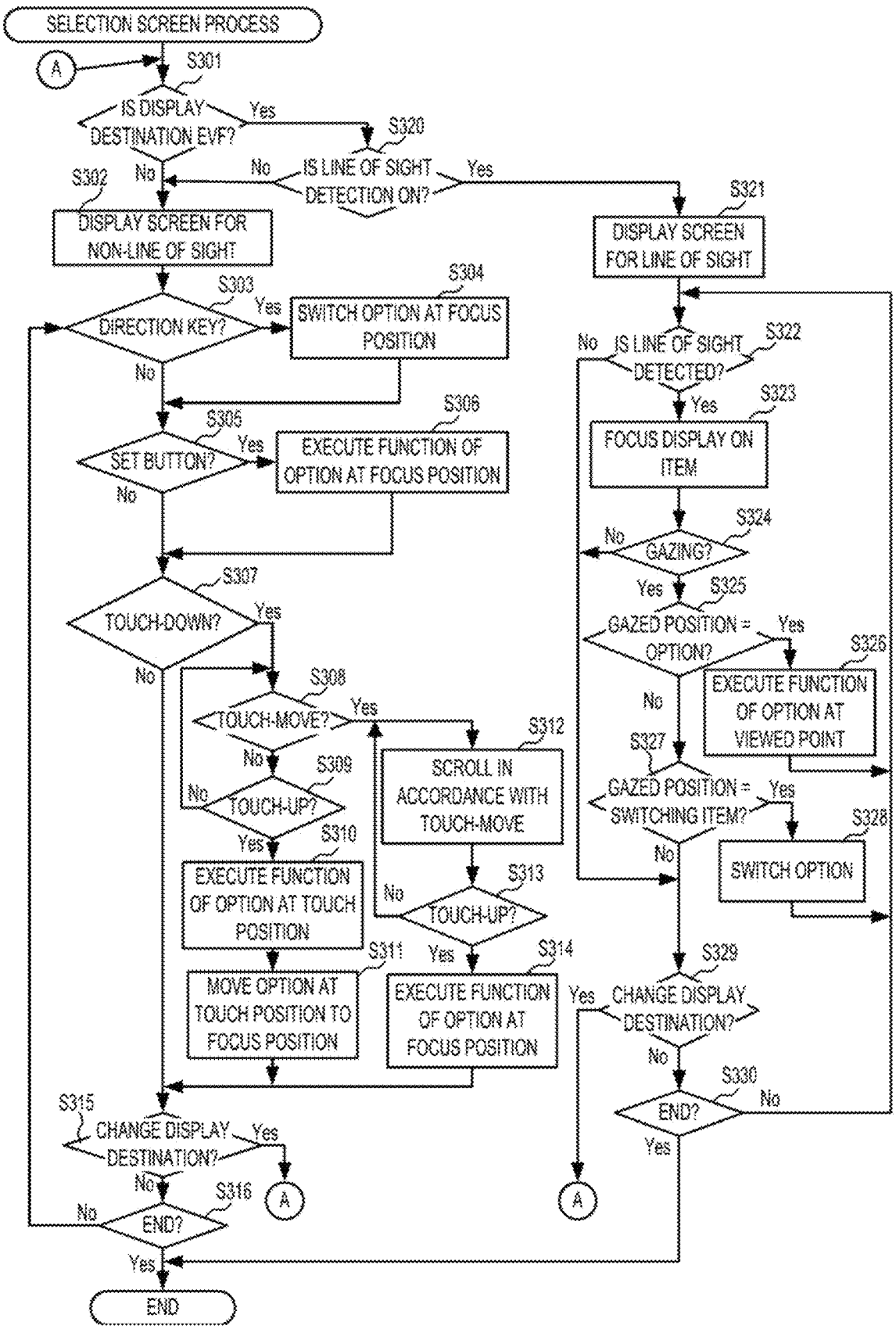

ELECTRONIC DEVICE FOR RECEIVING LINE OF SIGHT INPUT, METHOD OF CONTROLLING ELECTRONIC DEVICE, AND NON-TRANSITORY COMPUTER READABLE MEDIUM

BACKGROUND OF THE INVENTION

Field of the Invention

The present invention relates to an electronic device for receiving a line of sight input, a method of controlling the electronic device, and a non-transitory computer readable medium.

Description of the Related Art

Conventionally, in a digital device that includes a touch panel in a display unit to enable an intuitive operation, a user interface (UI) that takes advantage of a touch panel operation has been proposed to improve operability and visibility. Japanese Patent Application Publication No. 2016-189226 discloses that some of a large number of options are displayed side by side in a row, and when a user touches and selects one of the options, the display is changed to a display in which the selected option is at a center position (a center focus position). According to this, the user can easily understand the option selected by the user.

On the other hand, conventionally, an electronic device such as a camera in which a direction of a user's line of sight (eye direction) is detected to detect a region (a position) the user is observing in a visual field of a finder, whereby various photographing functions such as automatic focusing and automatic exposure are controlled has been proposed.

Japanese Patent Application Publication No. 2009-251658 discloses a technique of a display device in which, in a case in which a period in which a user's line of sight is fixed to a certain region exceeds a predetermined threshold, it is determined that the user is gazing at the region and a function corresponding to the gazing is performed.

In recent years, a display device that receives both an operation performed by a line of sight input and an operation performed by a touch such as a user's touch (for example, a touch operation on a touch panel) has been proposed. As a UI for an operation performed by touch, for example, a UI suitable for operation on a touch panel as disclosed in Japanese Patent Application Publication No. 2016-189226 may be adopted.

However, if the conventional technique disclosed in Japanese Patent Application Publication No. 2016-189226 is diverted for a UI for an operation performed by a line of sight input, operability and visibility of the line of sight input is hindered. Specifically, in a line of sight input, an option at a point of the line of sight is selected, and thus, if the option at the point of the line of sight is changed, it is difficult to select the option desired by the user.

SUMMARY OF THE INVENTION

Therefore, an object of the present invention is to display an operation screen with high operability in an electronic device which can receive an operation by a line of sight input and an operation on an operation unit.

An aspect of the present invention is:
an electronic device comprising:
an operation member; and
at least one memory and at least one processor which function as:
a receiving unit configured to receive a line of sight input by a user's line of sight, and
a control unit configured to perform control such that,
A) in case a first option group which includes a plurality of options is displayed in a state incapable of receiving option selection by the line of sight input, a) the first option group is moved, and b) a second option group that includes a plurality of options including one or more options included in the first option group and one or more options not included in the first option group is displayed, in accordance with an operation on the operation member for selecting any one option of the first option group, and
B) in case a third option group which includes a plurality of options is displayed in a state capable of receiving the option selection by the line of sight input, any one option of the third option group is selected without moving the third option group, in accordance with the line of sight input received by the receiving unit.

Further features of the present invention will become apparent from the following description of exemplary embodiments with reference to the attached drawings.

BRIEF DESCRIPTION OF THE DRAWINGS

FIG. 3 is a flowchart of a selection screen process according to the first embodiment;

DESCRIPTION OF THE EMBODIMENTS

First Embodiment

<External View of Digital Camera 100>

Figure 1A:
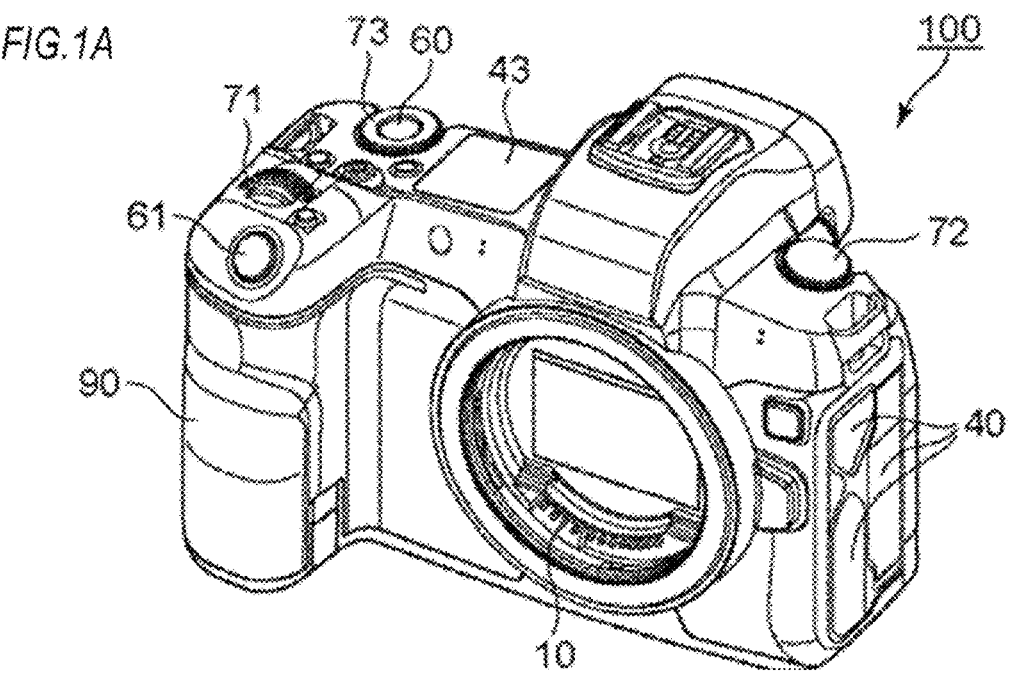
FIGS. 1A and 1B are external views of a digital camera according to a first embodiment.
Figure 1B:
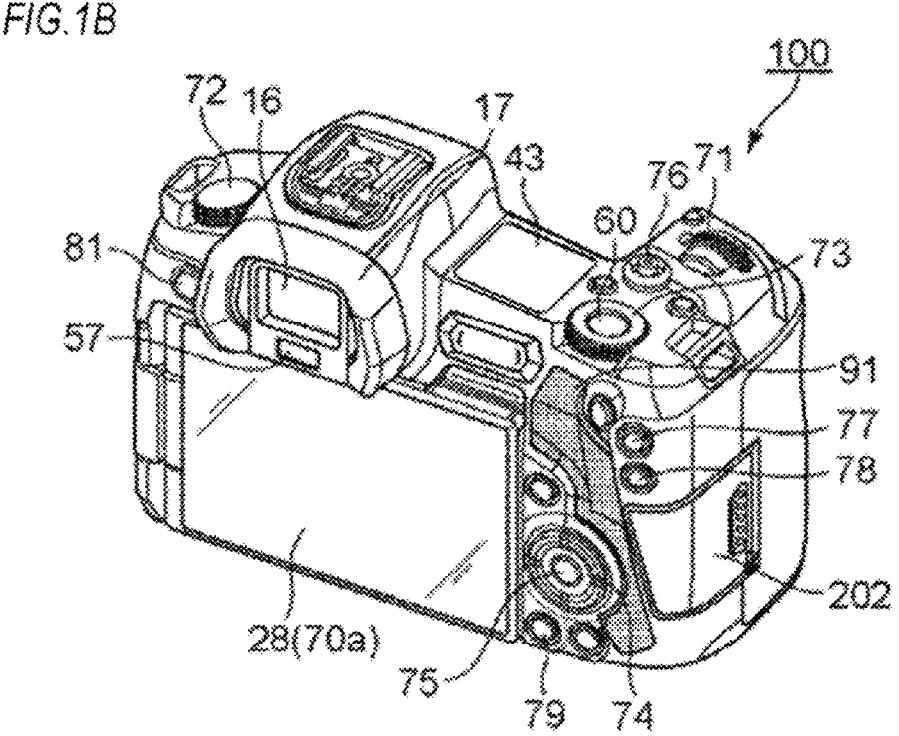

Hereinafter, preferred embodiments of the present invention will be described with reference to the figures. FIGS. 1A and 1B are external views of a digital camera 100 as an example of a device to which the present invention can be applied. FIG. 1A is a front perspective view of the digital camera 100, and FIG. 1B is a rear perspective view of the digital camera 100.

A display unit 28 is a display unit provided on a back surface of the digital camera 100 and displays images and various information. A touch panel 70a can detect a touch operation on a display surface (a touch operation surface) of the display unit 28. A finder outside display unit 43 is a display unit provided on an upper surface of the digital camera 100 and displays various setting values of the digital camera 100 such as a shutter speed and an aperture. A shutter button 61 is an operation member for giving an imaging instruction. A mode switch 60 is an operation member for switching between various modes. A terminal cover 40 is a cover that protects a connector (not shown) for connecting the digital camera 100 to an external device.

A main electronic dial 71 is a rotary operation member, and by turning the main electronic dial 71, the setting values such as the shutter speed and the aperture can be changed. A power switch 72 is an operation member for switching between power ON and OFF of the digital camera 100. A sub electronic dial 73 is a rotary operation member, and by turning the sub electronic dial 73, movement of a selection frame (a cursor), transmission of images, and the like can be performed. A four-way key 74 is configured such that upper, lower, left, and right portions thereof can be pressed, and can perform processing corresponding to a pressed portion of the four-way key 74. A SET button 75 is a push button and is mainly used to determine a selected item.

A video button 76 is used to start or stop video shooting (recording). An AE lock button 77 is a push button and an exposure state can be fixed by pressing the AE lock button 77 in an imaging standby state. An enlargement button 78 is an operation button for switching between ON and OFF of an enlargement mode in a live view display (LV display) of an imaging mode. By operating the main electronic dial 71 after turning on the enlargement mode, the live view image (LV image) can be enlarged or reduced. In a reproduction mode, the enlargement button 78 functions as an operation button for enlarging a reproduction image and increasing an enlargement ratio thereof. A reproduction button 79 is an operation button for switching between the imaging mode and the reproduction mode. By pressing the reproduction button 79 during the imaging mode, the mode is changed to the reproduction mode, and a latest image among images recorded on a recording medium 200 (which will be described later) can be displayed on the display unit 28. A menu button 81 is a push button used for performing an instruction operation for displaying a menu screen, and when the menu button 81 is pressed, the menu screen on which various settings can be made is displayed on the display unit 28. A user can intuitively perform various settings using the menu screen displayed on the display unit 28, the four-way key 74, and the SET button 75.

A communication terminal 10 is a communication terminal for the digital camera 100 to communicate with a lens unit 150 (detachable; which will be described later). An eyepiece unit 16 is an eyepiece unit of an eyepiece finder (a look-in type finder), and a user can visually recognize an image displayed on an internal EVF 29 (which will be described later) via the eyepiece unit 16. An eyepiece detection unit 57 is an eyepiece detection sensor that detects whether or not a user (a photographer) is looking in the eyepiece unit 16. A lid 202 is a lid of a slot for storing the recording medium 200 (which will be described later). A grip part 90 is a holding part that is shaped such that the user can easily hold it with a right hand when holding the digital camera 100. The shutter button 61 and the main electronic dial 71 are disposed at positions at which they can be operated with an index finger of the right hand while the digital camera 100 is held with the grip part 90 gripped by a little finger, a ring finger and a middle finger of the right hand. Further, in the same state, the sub electronic dial 73 is disposed at a position at which the sub electronic dial 73 can be operated with a thumb of the right hand. A thumb rest part 91 (a thumb standby position) is a grip member provided on the back surface side of the digital camera 100 at a location at which the thumb of the right hand holding the grip part 90 can be easily placed without operating any operation members. The thumb rest part 91 is formed of a rubber member or the like for increasing a holding force (a grip feeling).

<Configuration Block Diagram of Digital Camera 100>

Figure 2:
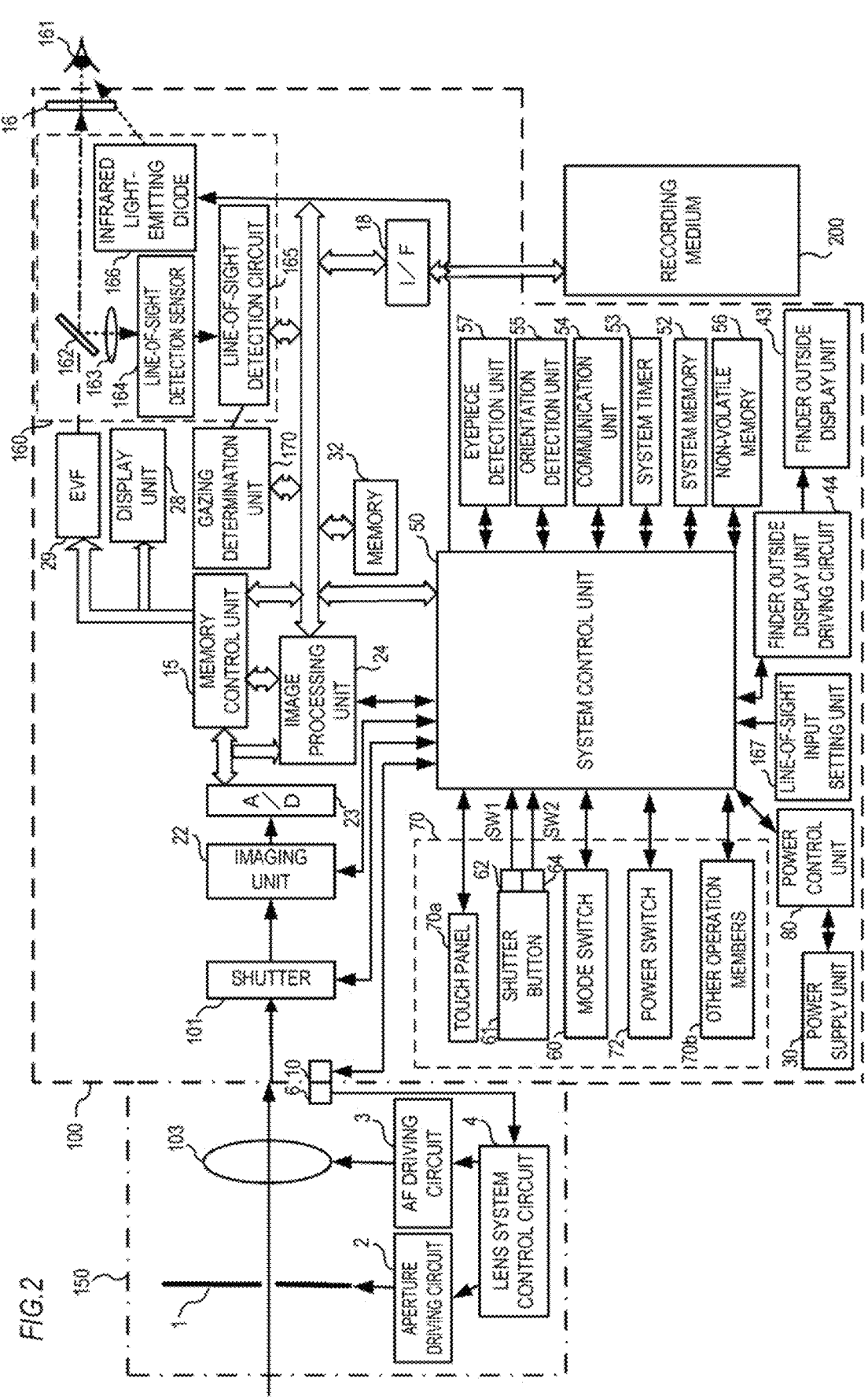
FIG. 2 is a block diagram of the digital camera according to the first embodiment.

FIG. 2 is a block diagram showing a configuration example of the digital camera 100. The lens unit 150 is a lens unit on which an interchangeable photographing lens is mounted. A lens 103 is normally configured of a plurality of lenses, but FIG. 2 simply shows only one lens. A communication terminal 6 is a communication terminal for the lens unit 150 to communicate with the digital camera 100 side, and the communication terminal 10 is a communication terminal for the digital camera 100 to communicate with the lens unit 150 side. The lens unit 150 communicates with a system control unit 50 via these communication terminals 6 and 10. In addition, the lens unit 150 performs control of an aperture 1 via an aperture driving circuit 2 using an internal lens system control circuit 4. Further, the lens unit 150 focuses by displacing the lens 103 via an AF driving circuit 3 using the lens system control circuit 4.

A shutter 101 is a focal plane shutter that can freely control an exposure time of an imaging unit 22 under control of the system control unit 50.

The imaging unit 22 is an imaging element configured of a CCD or a CMOS element that converts an optical image into an electrical signal. The imaging unit 22 may have an imaging plane phase difference sensor that outputs defocus amount information to the system control unit 50.

An image processing unit 24 performs predetermined processing (pixel interpolation, resize processing such as reduction, color conversion processing, and the like) on data from an A/D converter 23 or data from a memory control unit 15. Also, the image processing unit 24 performs a predetermined calculation process using captured image data, and the system control unit 50 performs exposure control and distance measurement control on the basis of the calculation results obtained by the image processing unit 24. Thus, through the lens (TTL) type autofocus (AF) processing, automatic exposure (AE) processing, flash pre-emission (EF) processing, and the like are performed. The image processing unit 24 further performs predetermined calculation processing using the captured image data and performs TTL type auto white balance (AWB) processing on the basis of obtained calculation results.

The memory control unit 15 controls data transmission and reception among the A/D converter 23, the image processing unit 24, and a memory 32. Output data from the A/D converter 23 is written to the memory 32 via the image processing unit 24 and the memory control unit 15. Alternatively, output data from the A/D converter 23 is written to the memory 32 via the memory control unit 15 without passing through the image processing unit 24. The memory 32 stores image data that is obtained by the imaging unit 22 and converted into digital data by the A/D converter 23 and image data to be displayed on the display unit 28 and the EVF 29. The memory 32 has a sufficient storage capacity for storing a predetermined number of still images and a predetermined amount of time of videos and audios.

Further, the memory 32 also serves as an image display memory (a video memory). The display image data written in the memory 32 is displayed on the display unit 28 or the EVF 29 via the memory control unit 15. Each of the display unit 28 and the EVF 29 performs display in accordance with a signal from the memory control unit 15 on a display such as an LCD or an organic EL. The live view display (LV) can be performed by sequentially transferring the data that is A/D-converted by the A/D converter 23 and stored in the memory 32 to the display unit 28 or the EVF 29 and displaying it. Hereinafter, an image displayed in the live view display is referred to as a live view image (LV image).

A line-of-sight detection unit 160 (eye tracker, eye tracking unit) detects a line of sight of the user in the eyepiece unit 16. The line-of-sight detection unit 160 includes a dichroic mirror 162, an imaging lens 163, a line-of-sight detection sensor 164, a line-of-sight detection circuit 165, and an infrared light-emitting diode 166. Also, since the system control unit 50 can execute a predetermined process in accordance with detection of the line of sight, the line-of-sight detection unit 160 can be said to be referred to as a part of an operation unit 70.

The infrared light-emitting diode 166 is a light emitting element for detecting a viewed position (position of the line of sight) of the user in a finder screen and irradiates an eyeball (eye) 161 of the user with infrared light. The infrared light emitted from the infrared light-emitting diode 166 is reflected by the eyeball (eye) 161, and the reflected infrared light reaches the dichroic mirror 162. The dichroic mirror 162 reflects only infrared light and transmits visible light. The reflected infrared light of which an optical path has been changed forms an image on an imaging plane of the line-of-sight detection sensor 164 via the imaging lens 163. The imaging lens 163 is an optical member that constitutes a line of sight detection optical system. The line-of-sight detection sensor 164 includes an imaging device such as a CCD image sensor.

The line-of-sight detection sensor 164 photoelectrically converts the reflected infrared light that is incident thereon into an electrical signal and outputs the electrical signal to the line-of-sight detection circuit 165. The line-of-sight detection circuit 165 detects a viewed position of the user from movement of the eyeball (eye) 161 of the user on the basis of the output signal of the line-of-sight detection sensor 164 and outputs detection information to the system control unit 50 and a gazing determination unit 170.

A line-of-sight input setting unit 167 sets whether the detection of the line of sight performed by the line-of-sight detection circuit 165 (line-of-sight detection unit 160) is valid or invalid. Alternatively, the line-of-sight input setting unit 167 sets whether processing of the system control unit 50 in accordance with an input of the line of sight is valid or invalid. For example, the user can arbitrarily set such a valid/invalid setting by operating the operation unit 70 in a menu setting.

The gazing determination unit 170 determines on the basis of the detection information received from the line-of-sight detection circuit 165 that, when a period in which the line of sight of the user is fixed to a certain area exceeds a predetermined threshold, the user is gazing at the area. Therefore, it can be said that the area is a gazing position (gazing area) at which the gazing is performed. In addition, "the line of sight is fixed to a certain area" indicates that, for example, an average position of movement of the line of sight is within the area until a predetermined period elapses, and that a variation (a dispersion) thereof is smaller than a predetermined value. Further, the predetermined threshold can be arbitrarily changed by the system control unit 50. Also, the gazing determination unit 170 may not be provided as an independent block, and the system control unit 50 may execute the same function as the gazing determination unit 170 on the basis of the detection information received from the line-of-sight detection circuit 165.

Various setting values of the camera such as the shutter speed and the aperture are displayed on the finder outside display unit 43 via a finder outside display unit driving circuit 44.

A non-volatile memory 56 is a memory that can be electrically erased and recorded on, and is, for example, a flash-ROM or the like. The non-volatile memory 56 stores constants, programs, and the like for an operation of the system control unit 50. The programs referred to here are programs for executing various flowcharts, which will be described later in the present embodiment.

The system control unit 50 is a control unit including at least one processor or circuit and controls the entire digital camera 100. The system control unit 50 realizes each process of the present embodiment, which will be described later, by executing programs recorded in the non-volatile memory 56 described above. A system memory 52 is, for example, a RAM, and the system control unit 50 develops, in the system memory 52, constants and variables for the operation of the system control unit 50, programs read from the non-volatile memory 56, and the like. Also, the system control unit 50 performs display control by controlling the memory 32, the display unit 28, and the like.

A system timer 53 is a time measuring unit that measures a time used for various controls and a time of an embedded clock.

A power control unit 80 is configured of a battery detection circuit, a DC-DC converter, a switch circuit for switching a block to be energized, and the like, and detects whether or not a battery is mounted, a type of the battery, detection of a remaining battery level, and the like. Further, the power control unit 80 controls the DC-DC converter on the basis of the detection results and an instruction of the system control unit 50 and supplies a necessary voltage to each unit including the recording medium 200 for a necessary period. A power supply unit 30 is configured of a primary battery such as an alkaline battery and a lithium battery, a secondary battery such as a NiCd battery, a NiMH battery, and a Li battery, an AC adapter, and the like.

A recording medium I/F 18 is an interface with the recording medium 200 such as a memory card or a hard disk. The recording medium 200 is a recording medium such as a memory card for recording captured images and includes a semiconductor memory, a magnetic disk, and the like.

A communication unit 54 transmits and receives a video signal and an audio signal to and from an external device connected in a wireless manner or by a wired cable. The communication unit 54 can also be connected to a wireless local area network (LAN) or the Internet. Further, the communication unit 54 can also communicate with the external device using Bluetooth (registered trademark) or Bluetooth (registered trademark) Low Energy. The communication unit 54 can transmit an image (including an LV image) captured by the imaging unit 22 and an image recorded in the recording medium 200 and can receive image data and other various information from the external device.

An orientation detection unit 55 detects an orientation of the digital camera 100 with respect to a direction of gravity. On the basis of the orientation detected by the orientation detection unit 55, whether an image captured by the imaging unit 22 is an image captured by holding the digital camera 100 horizontally or an image captured by holding the digital camera 100 vertically can be determined. The system control unit 50 can add orientation information corresponding to the orientation detected by the orientation detection unit 55 to an image file of the image captured by the imaging unit 22, or records the image by rotating it. For the orientation detection unit 55, an acceleration sensor, a gyro sensor, or the like can be used. It is also possible to detect movement (a pan, a tilt, a lift, whether stationary or not, etc.) of the digital camera 100 using the acceleration sensor or the gyro sensor serving as the orientation detection unit 55.

The eyepiece detection unit 57 is an eyepiece detection sensor that detects approach (eye proximity) of an eye (object) 161 to the eyepiece unit 16 of the eyepiece finder 17 (hereinafter, simply referred to as a "finder") and removal (eye separation) of the eye (object). The system control unit 50 switches between display (a display state) and non-display (a non-display state) of the display unit 28 and the EVF 29 in accordance with a state detected by the eyepiece detection unit 57. More specifically, at least in a photographing standby state and in a case in which switching of a display destination is automatic switching, during non-eye proximity, the display destination is set to the display unit 28 and its display is turned on and the EVF 29 is set to non-display. In addition, during the eye proximity, the display destination is set to the EVF 29 and its display is turned on, and the display unit 28 is set to non-display. For the eyepiece detection unit 57, for example, an infrared proximity sensor can be used, and it is possible to detect approach of any object to the eyepiece unit 16 of the finder 17 incorporating the EVF 29. When an object approaches, infrared light emitted from a light emitting unit (not shown) of the eyepiece detection unit 57 is reflected by the object and received by a light receiving unit (not shown) of the infrared proximity sensor. On the basis of an amount of the received infrared light, it is also possible to determine how far the object is from the eyepiece unit 16 (an eye proximity distance). As described above, the eyepiece detection unit 57 performs eye proximity detection that detects an approaching distance of the object to the eyepiece unit 16. It is assumed that when the object having approached the eyepiece unit 16 to within a predetermined distance after a non-eye proximity state (a non-proximity state) is detected, it is detected that the eye has approached thereto. It is assumed that when the object whose approach has been detected becomes separated therefrom after the eye proximity state (proximity state) by at least a predetermined distance, it is detected that the eye has been separated therefrom. A threshold for detecting the eye proximity and a threshold for detecting the eye separation may be different from each other, for example, by providing hysteresis. Further, after detection of the eye proximity, an eye proximity state is assumed until the eye separation is detected. After detection of the eye separation, a non-eye proximity state is assumed until the eye proximity is detected. Also, the infrared proximity sensor is an example, and the eyepiece detection unit 57 may use another sensor as long as it can detect approaching of an eye or an object regarded as the eye proximity.

The system control unit 50 can detect the following operations or states of the eyepiece unit 16 by controlling the gazing determination unit 170 or the eyepiece detection unit 57.

A line of sight that has not been directed to the eyepiece unit 16 is newly directed to the eyepiece unit 16. That is, this is the start of inputting the line of sight.

A state in which the line of sight is being input to the eyepiece unit 16.

A state in which the user is gazing at the eyepiece unit 16.

The line of sight directed to the eyepiece unit 16 has been removed. That is, this is the end of inputting the line of sight.

A state in which no line of sight is input to the eyepiece unit 16.

These operations and states and the position (direction) from which the line of sight is directed to the eyepiece unit 16 are notified to the system control unit 50 via an internal bus, and the system control unit 50 determines what operation (operation of the line of sight) has been performed on the eyepiece unit 16 on the basis of the notified information. an operation performed by a line of sight input is a non-touch (non-contact) operation without a user touching (contacting) an operation member.

The operation unit 70 is an input unit that receives an operation (user operation) from a user, and is used to input various operation instructions to the system control unit 50. As shown in FIG. 2, the operation unit 70 includes the mode switch 60, the shutter button 61, the power switch 72, the touch panel 70a, and the like. The operation unit 70 includes, as other operation members 70b, the main electronic dial 71, the sub electronic dial 73, the four-way key 74, the SET button 75, the video button 76, the AE lock button 77, the enlargement button 78, the reproduction button 79, the menu button 81, and the like.

The mode switch 60 switches an operation mode of the system control unit 50 to one of a still image shooting mode, a video shooting mode, a reproduction mode, and the like. Modes included in the still image shooting mode include an auto shooting mode, an auto scene determination mode, a manual mode, an aperture priority mode (Av mode), a shutter speed priority mode (Tv mode), and a program AE mode (P mode). In addition, there are various scene modes, custom modes, and the like, which are imaging settings for each imaging scene. The mode switch 60 allows the user to directly switch to any of these modes. Alternatively, after temporarily switching to a list screen of the imaging modes with the mode switch 60, the mode may be selectively switched to any of displayed modes by using another operation member. Similarly, the video shooting mode may include a plurality of modes.

The shutter button 61 includes a first shutter switch 62 and a second shutter switch 64. The first shutter switch 62 is turned on by so-called half-pressing (an imaging preparation instruction) during operation of the shutter button 61 and generates a first shutter switch signal SW1. The system control unit 50 starts an imaging preparation operation such as an autofocus (AF) process, an auto exposure (AE) process, an auto white balance (AWB) process, and a flash pre-emission (EF) process in response to the first shutter switch signal SW1. The second shutter switch 64 is turned on when the operation of the shutter button 61 is completed, that is, when the shutter button 61 is fully pressed (an imaging instruction) and generates a second shutter switch signal SW2. In response to the second shutter switch signal SW2, the system control unit 50 starts a series of imaging processing operations from reading out the signal from the imaging unit 22 to writing the captured image as an image file on the recording medium 200.

The touch panel 70a and the display unit 28 can be integrally formed. For example, the touch panel 70a is configured such that light transmittance does not hinder display on the display unit 28 and is attached to an upper layer of a display surface of the display unit 28. In addition, input coordinates on the touch panel 70a are associated with display coordinates on the display surface of the display unit 28. Thus, it is possible to provide a graphical user interface (GUI) as if the user could directly operate a screen displayed on the display unit 28. The system control unit 50 can detect the following operations or states on the touch panel 70a.

A finger or pen that has not touched the touch panel 70a newly touches the touch panel 70a. That is, this is the start of a touch (hereinafter, referred to as a touch-down).

A state in which the touch panel 70a is being touched with a finger or a pen (hereinafter, referred to as a touch-on).

A finger or a pen is moving while touching the touch panel 70a (hereinafter, referred to as a touch-move).

A finger or pen touching the touch panel 70a has separated (been released) from the touch panel 70a. That is, the end of the touch (hereinafter, referred to as a touch-up).

A state in which nothing is touching on the touch panel 70a (hereinafter, referred to as a touch-off).

When the touch-down is detected, the touch-on is also detected at the same time. After the touch-down, the touch-on is normally continuously detected unless the touch-up is detected. When the touch move is detected, the touch-on is detected at the same time. Even when the touch-on is detected, the touch move is not detected unless a touch position is moved. After all the touched fingers or pens are detected to have been touched up, it becomes the touch-off.

These operations and states and the position coordinates in which the finger or the pen is touching the touch panel 70a are notified to the system control unit 50 via the internal bus. Then, the system control unit 50 determines what operation (touch operation) has been performed on the touch panel 70a on the basis of the notified information. As for the touch-move, a moving direction of the finger or the pen moving on the touch panel 70a can also be determined for each of a vertical component and a horizontal component on the touch panel 70a on the basis of changes in the position coordinates. When it is detected that the touch-move has been performed for at least a predetermined distance, it is determined that a sliding operation has been performed. An operation of quickly moving a finger on the touch panel 70a by a certain distance while touching the finger and releasing the finger is referred to as a flick. In other words, the flick is an operation of quickly tracing the touch panel 70a as if to flick it with a finger. When it is detected that a touch-move has been performed for at least a predetermined distance at at least a predetermined speed, and in this state, the touch-up is detected, it can be determined that the flick has been performed (it can be determined that there has been the flick following the sliding operation). Further, a touch operation of touching (multi-touching) a plurality of positions (for example, two points) together to bring the touch positions closer to each other is referred to as a pinch-in, and a touch operation for moving the touch positions away from each other is referred to as a pinch-out. The pinch-out and pinch-in are collectively referred to as a pinch operation (or simply a pinch). The touch panel 70a may be any of various types of touch panels such as a resistive film type, a capacitive type, a surface acoustic wave type, an infrared type, an electromagnetic induction type, an image recognition type, and an optical sensor type. There are a method of detecting that a touch has been made when there is a touch on the touch panel, and a method of detecting that a touch has been made when there is a finger or a pen approaching the touch panel, and any method may be used.

<Selection Screen Process>

In the following, a selection screen process in which options are displayed in accordance with a user's operation on the digital camera 100 will be described with reference to a flowchart shown in FIG. 3. In the following, the digital camera 100 displays different selection screens (operation screens) for a case in which the options are controlled by a line of sight (a line of sight input) received by the line of sight detection unit 160 and for a case in which the options are controlled by operating an operation member provided in the digital camera 100.

Figure 4A:
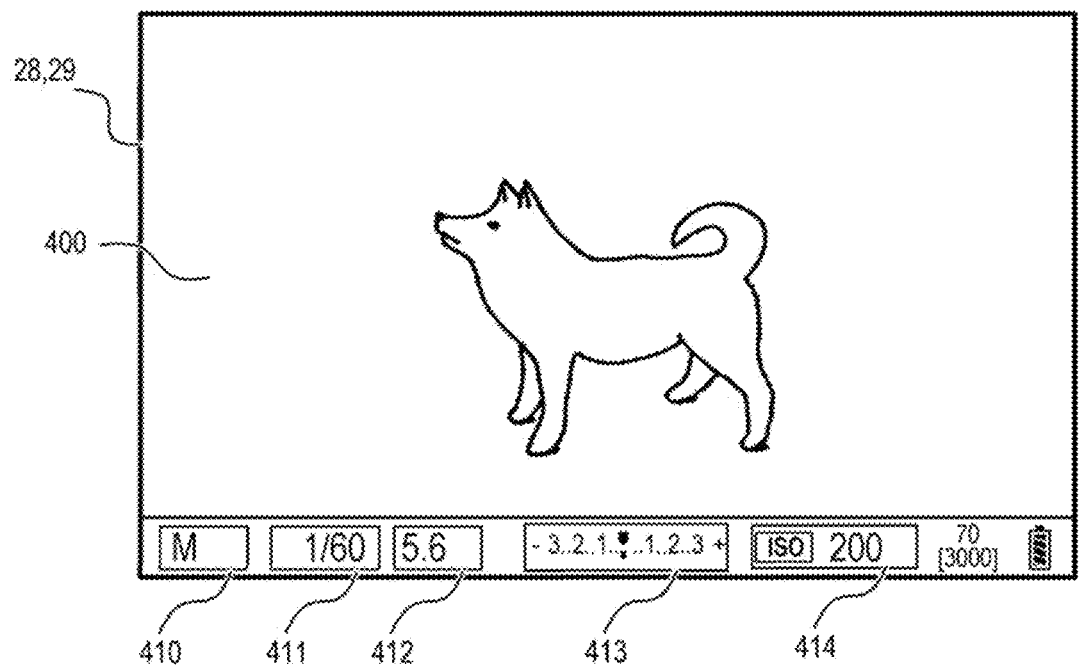
FIGS. 4A to 4C are selection screens according to the first embodiment.

When the digital camera 100 is activated in a photographing standby state, the digital camera 100 displays a screen of FIG. 4A on the display unit 28 or the EVF 29. Here, an LV image 400 and setting items 410 to 414 are displayed. The setting items 410 to 414 indicate current setting values of photographing mode, shutter speed, aperture (F value), exposure correction, and ISO sensitivity, respectively. Further, each of the setting items 410 to 414 is also an instruction icon for giving a setting change instruction of each setting item. When any of the setting items 410 to 414 is selected, the selection screen process (FIG. 3) for displaying a corresponding option list of the setting item starts.

In S301, the system control unit 50 determines whether a current display destination is the EVF 29 or not. If the display destination is the EVF 29, the process proceeds to S320, and if not (that is, the display destination is the display unit 28), the process proceeds to S302. The display destination can be switched by a display destination switching operation by the user (pressing a display destination switching button (not shown) or a setting operation of the display destination on a setting menu screen). Further, the display destination can be automatically switched depending on a situation of eyepiece detection in the eyepiece detection unit 57. The system control unit 50 sets the display destination to the EVF 29 when the eyepiece detection unit 57 detects the eye proximity, and sets the display destination to the display unit 28 when the eyepiece detection unit 57 does not detect the eye proximity. Therefore, it may be determined whether or not the eyepiece detection unit 57 detects the eye proximity for determining the display destination in S301, and if the eye proximity has been detected, the process may proceed to S320, and if not, the process may proceed to S302.

In S302, the system control unit 50 displays a selection screen (a screen for non-line of sight) for the case in which the line of sight input is not used on the current display destination (the display unit 28 or the EVF 29). The selection screen displays a list of options (setting options) that can be set as a setting value of a selected setting item among the setting items 410 to 414.

Figure 4B:
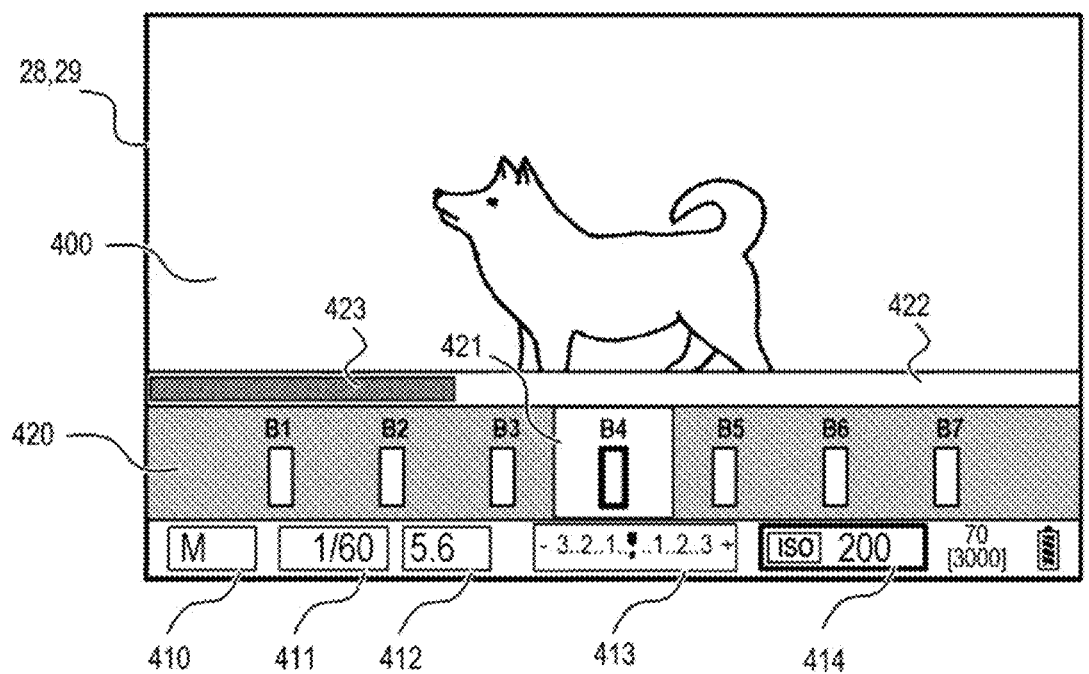

FIG. 4B shows a display example of the screen for non-line of sight. Display elements the same as those in FIG. 4A are denoted by the same reference numerals, and descriptions thereof will be omitted. In a setting option display region 420 for non-line of sight, some setting options (in the illustrated example, setting options B1 to B7; a setting option group) among all setting options (for example, setting options B1 to B20; a setting option row) that can be set for the setting items are displayed. A focus position 421 is displayed at a fixed position on the screen, and in the illustrated example, is displayed in a lateral center of the setting option display region 420 for non-line of sight. In the setting option display region 420 for non-line of sight, a display position of each setting option is changed in response to the selection to display the selected setting option of the plurality of setting options at the focus position 421 fixed on the screen. Hereinafter, such a selection method in which the selected setting option is displayed in the so-called center focus is referred to as a center focus method. The illustrated example is a setting screen for ISO sensitivity, and the setting option B4 corresponding to a currently set ISO 200 is displayed at the focus position 421 and is in a selected state. A scroll bar 422 indicates positions of some of the displayed setting options (in the illustrated example, setting options B1 to B7) among all the setting options (for example, setting options B1 to B20) that can be set. In the illustrated example, a knob 423 is displayed in a partial range from a left end in the entire scroll bar 422, there are setting options not displayed on a right side in addition to the currently displayed setting options B1 to B7, and the user can recognize that scrolling is possible.

In S303, the system control unit 50 determines whether the left key or the right key of the four-way key 74 has been operated (pressed). If the left or right key of the four-way key 74 is operated, the process proceeds to S304, and if not, the process proceeds to S305.

In S304, the system control unit 50 switches the option (setting option) displayed at the focus position 421. For example, if the right key is operated once in the state in FIG. 4B, the system control unit 50 moves the entire setting option row by one to the left to display the setting option B5 at the focus position 421. In this case, the setting option B1 is hidden and the setting options B2 to B8 are displayed. If the left key has been operated once in the state in FIG. 4B, the system control unit 50 moves the entire setting option row by one to the right to display the setting option B3 at the focus position 421. In this case, the setting option B7 is hidden and the setting options B1 to B6 are displayed. Also, here, "by one" is by one unit of the setting option.

In S305, the system control unit 50 determines whether or not the SET button 75 has been pressed. If the SET button 75 has been pressed, the process proceeds to S306, and if not, the process proceeds to S307.

In S306, the system control unit 50 executes a function corresponding to the option (setting option) at the focus position 421. For example, if the setting option B5 is displayed at the focus position 421, ISO 250 corresponding to the setting option B5 is set. The set contents are recorded in the non-volatile memory 56 and applied to the next photographing.

In S307, the system control unit 50 determines whether or not a touch-down has been performed to a position (an option corresponding region) on the touch panel 70a at which the setting option can be selected. Here, if the display destination is the display unit 28, the option corresponding region is the setting option display region 420. If the display destination is the EVF 29, the user performs a relative position designation on the touch panel 70a while looking at the EVF 29, and thus the option corresponding region is a region of the touch panel 70a in which the relative position designation can be performed. If it is determined that a touch-down on the option corresponding region has been performed, the process proceeds to S308, and if not, the process proceeds to S315.

Further, the relative position designation is a position designation method similar to position designation using a mouse or the like, and is a position designation method in which relative position designation is performed in accordance with a direction and a movement amount of a touch-move and a touch-down position itself is not used for position designation. For example, a display object is not moved at the time of a touch-down (does not change from a position before the touch). When a touch move is performed, the display object is moved from the position before the touch by a distance proportional to the movement amount of the touch-move in a direction based on the direction of the touch-move.

In S308, the system control unit 50 determines whether or not a touch-move on the touch panel 70a has been performed. If a touch-move has been performed, the process proceeds to S312, and if not, the process proceeds to S309.

In S309, the system control unit 50 determines whether or not a touch-up from the touch panel 70a has been performed. If a touch-up has been performed, the process proceeds to S310, and if not, the process returns to S308. Here, a touch-up is an operation of selecting any one setting option from the displayed setting options.

Figure 5A:
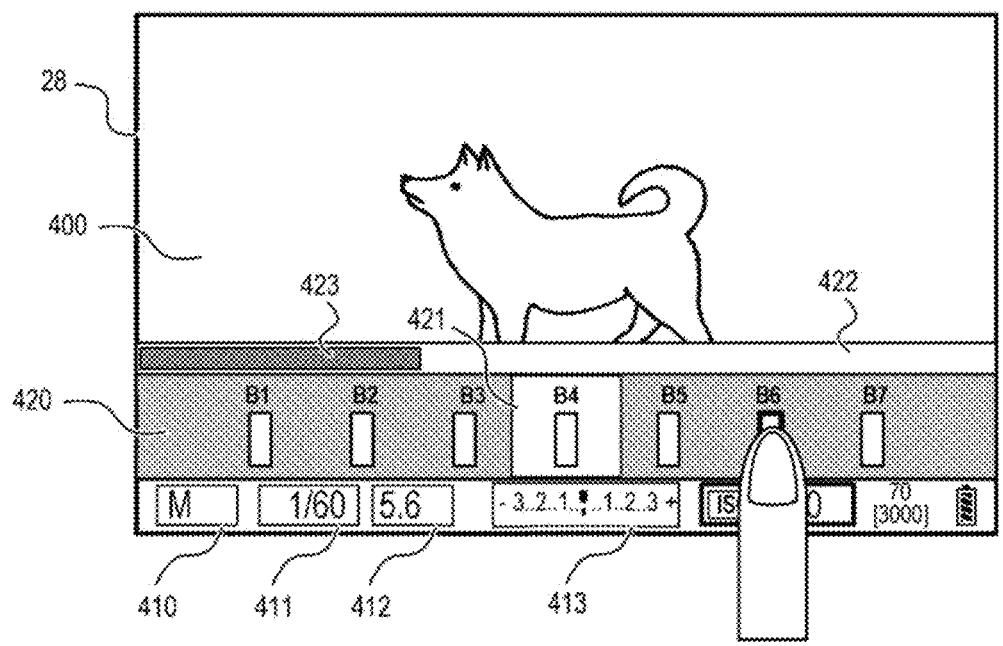
FIGS. 5A to 5D are screens for non-line of sight according to the first embodiment.

In S310, if the display destination is the display unit 28, the system control unit 50 executes a function of the setting option displayed at the position corresponding to the touch position immediately before the touch-up (equivalent to a touch-down position because a touch-move is not performed). Each of the displayed setting options has a touch sensitive region that is larger than each display region, and is partitioned off such that, when a touch position is within the setting option display region 420, it corresponds to one of the setting options. For example, as shown in FIG. 5A, if the user performs a touch-down on the setting option B6 and releases the touch without a touch-move, the function allocated to the touched setting option B6 is executed (for example, an ISO sensitivity of 320 is set).

Figure 5B:
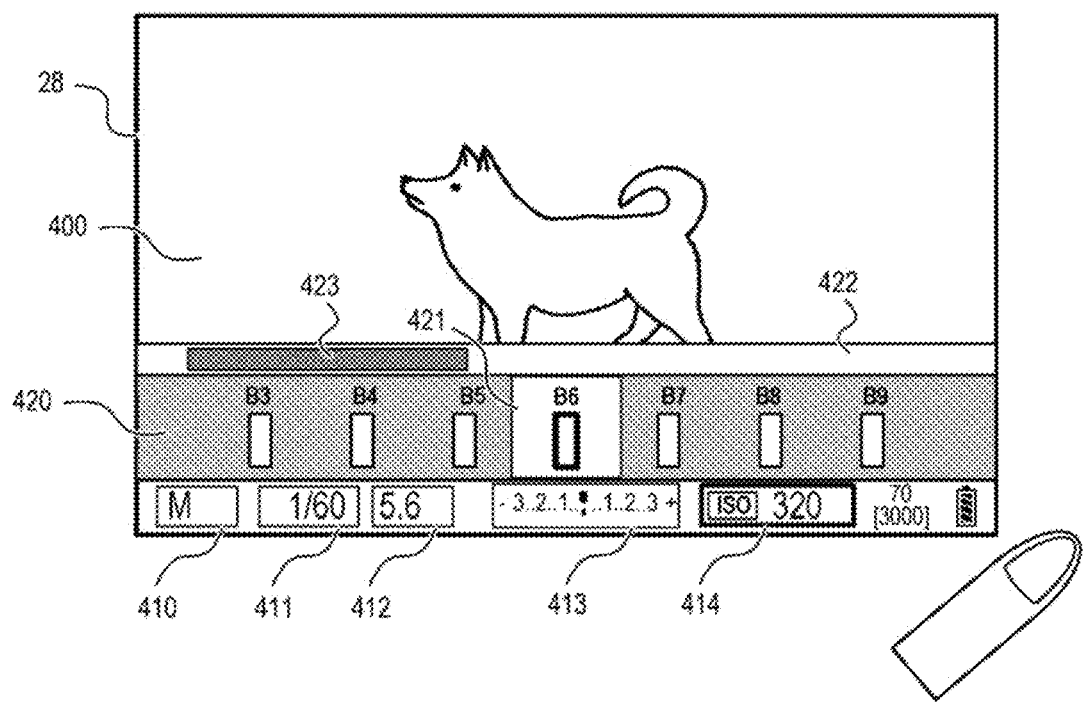

In S311, the system control unit 50 moves the setting option displayed at the position corresponding to the touch position (equivalent to a touch-down position because a touch-move is not performed) immediately before a touch-up to the focus position 421 (the center of the setting option display region 420). For example, if the user performs a touch-down on the setting option B6 and releases the touch without a touch-move as shown in FIG. 5A, the touched setting option B6 moves to the focus position 421 and stops as shown in FIG. 5B. Also, control of S310 and S311 may be performed in reverse order. That is, the system control unit 50 may move the touched setting option to the focus position 421 and then execute the function of the touched setting option, instead of executing the function of the touched setting option and then moving it to the focus position 421.

Figure 5C:
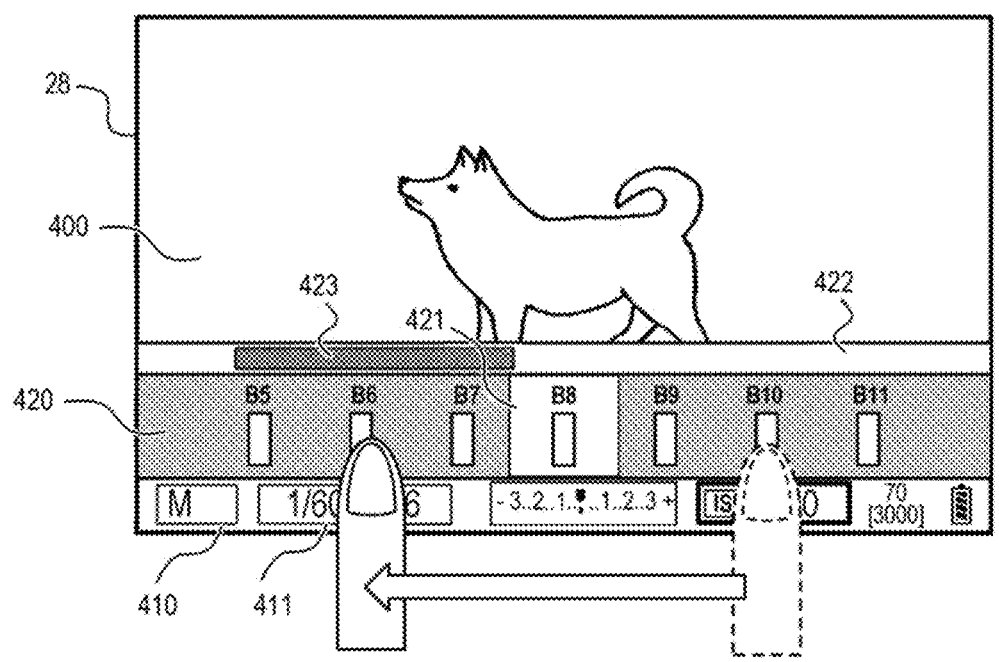
Figure 5D:
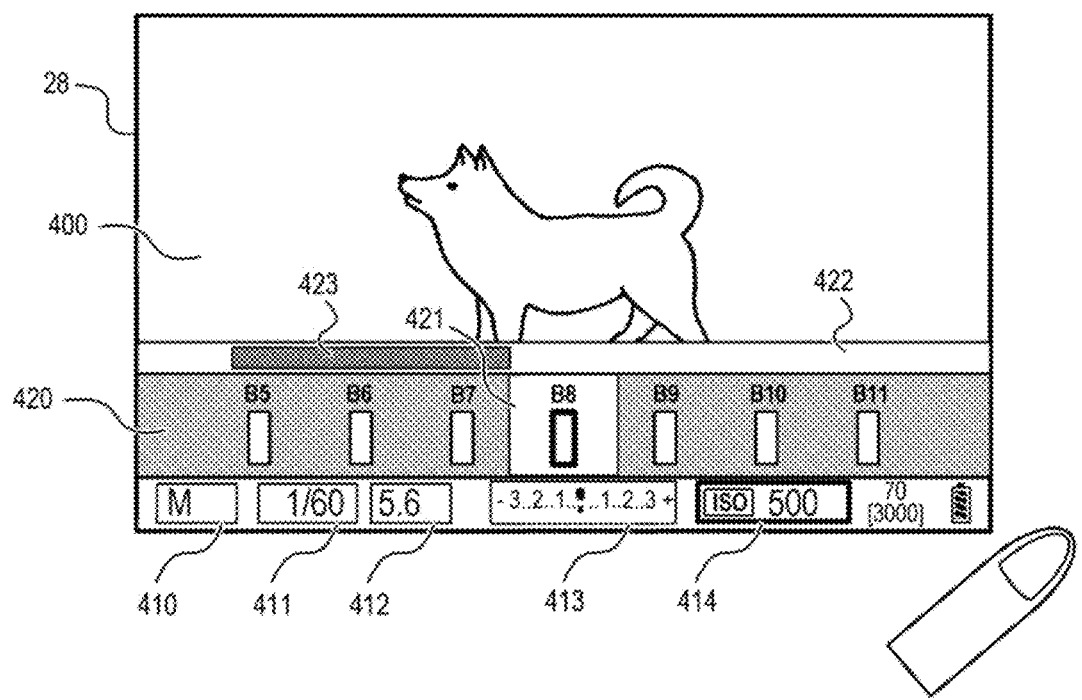

In S312, the system control unit 50 scrolls the setting option row in accordance with an amount of a touch-move. Scrolling can be stopped by moving at least by not more than one setting option unit (not more than one unit). For example, as shown in FIG. 5A, when scrolling is performed to the left by performing a touch-down on the setting option B6 and a touch-move to the left, and the display state as shown in FIG. 5C in which the setting option B8 is positioned at the focus position 421 can be set. In the illustrated example, by performing scrolling, the state in which the setting options B1 to B7 (an option group α) are displayed (FIG. 5A) is changed to the state in which the setting options B5 to B11 (an option group γ) are displayed. That is, the option group γ includes the setting options B5 to B7 that are also included in the option group α, and setting options B8 to B11 that are not included in the option group α are newly included. Further, the setting options B1 to B4 that are included in the option group α are not displayed because they have scrolled outside of the screen of the option group γ. That is, the state can be changed to a state in which only some of the displayed setting options have been switched, rather than a state in which all of the displayed setting options have been switched. In addition, the fact that scrolling can be stopped by moving at least by not more than one setting option unit indicates that it can be stopped by moving from a state in which the option group α in FIG. 5A is displayed to a state in which an option group β (an option group shifted by one setting option unit) is displayed. Alternatively, the fact that scrolling can be stopped by moving at least by not more than one setting option unit indicates that it can be stopped by moving by a movement amount less than that (one setting option unit).

In S313, the system control unit 50 determines whether or not a touch-up from the touch panel 70a has been performed.

If it is determined that a touch-up has been performed, the process proceeds to S314, and if not, the process proceeds to S312.

In S314, the system control unit 50 executes the function of the setting option that is positioned at the focus position 421 as a result of scrolling the setting option row in accordance with a touch-move. For example, if a touch-up has been performed in the state shown in FIG. 5C as a result of a touch-move, the function of the setting option B8 positioned at the focus position 421 at the time of the touch-up is executed. For example, an ISO sensitivity of 500 may be set. Also, a function may be executed each time the setting option positioned at the focus position 421 is switched according to a touch-move before the touch is released rather than at the time of a touch-up. In addition, in a case in which a touch-move is performed, the function may be not executed even when a touch-up is performed or even during touching, and may be executed in a case in which a next decision operation (an operation of performing touching and then a touch-up without a touch-move or pressing the SET button 75) is performed.

In S315, the system control unit 50 determines whether or not the display destination has been changed. If there is an event (detection of the eye proximity or an operation of switching the display destination) of changing the display destination from the display unit 28 to the EVF 29, the process proceeds to S301, and if not, the process proceeds to S316.

In S316, the system control unit 50 determines whether or not there is an end event of the selection screen process (turning the power off, or an operation of closing the selection screen, etc.). If there is an end event, the process ends, and if there is no end event, the process returns to S303.

In S320, the system control unit 50 determines whether or not the setting of the line of sight detection is on (valid). Also, the user can set in advance whether or not the line of sight detection is turned on (valid) or turned off (invalid) on the basis of a user operation on the line of sight input setting unit 167. If the line of sight detection is set to be on (valid), a line of sight detection operation in the line of sight detection unit 160 is performed, and control based on the line of sight of the user who looks at the EVF 29 is performed. If the line of sight detection is set to be off (invalid), the line-of-sight detection operation in the line of sight detection unit 160 is stopped, and the control based on the line of sight of the user who looks at the EVF 29 is no longer performed. A user who does not like operating using a line of sight can perform an operation that is not affected by the line of sight even in a case of looking at the EVF 29 by turning off (invalid) the line of sight detection. If it is determined in S320 that the line of sight detection is turned on (valid), the process proceeds to S321, and if not, that is, if it is turned off (invalid), the process proceeds to S302. As described above, even if the display destination is the EVF 29, the selection screen (the screen for non-line of sight) for not using the line of sight input is displayed when the line of sight detection is set to be off (invalid). Therefore, the screen for non-line of sight (the selection screen for the case of not using the line of sight input) and the screen for line of sight (the selection screen for the case of using the line of sight input) may be displayed on the EVF 29 that is the same display unit.

Although the selection screen to be displayed is selected as a result of the determinations in S301 and S320 in the present embodiment, the selection screen to be displayed may be selected depending simply on whether or not the line of sight detection is turned on or off in S320 without performing the determination in S301. That is, when the selection screen process starts, the process of S301 may not be performed and the process may proceed to S320. Further, the processes of S301 and S320 may be arbitrary processes as long as they are processes for determining whether or not the selection of the setting options by the line of sight input is received. That is, when the selection screen process starts, the process may proceed to S321 if the selection of the setting options by the line of sight input is received, and the process may proceed to S302 if the selection of the setting options by the line of sight input is not received.

In S321, the system control unit 50 displays the selection screen (screen for line of sight) for using the line of sight input on the EVF 29. The selection screen is a list of the options (setting options) that can be set as the setting values of the setting items selected from the setting items 410 to 414.

Figure 4C:
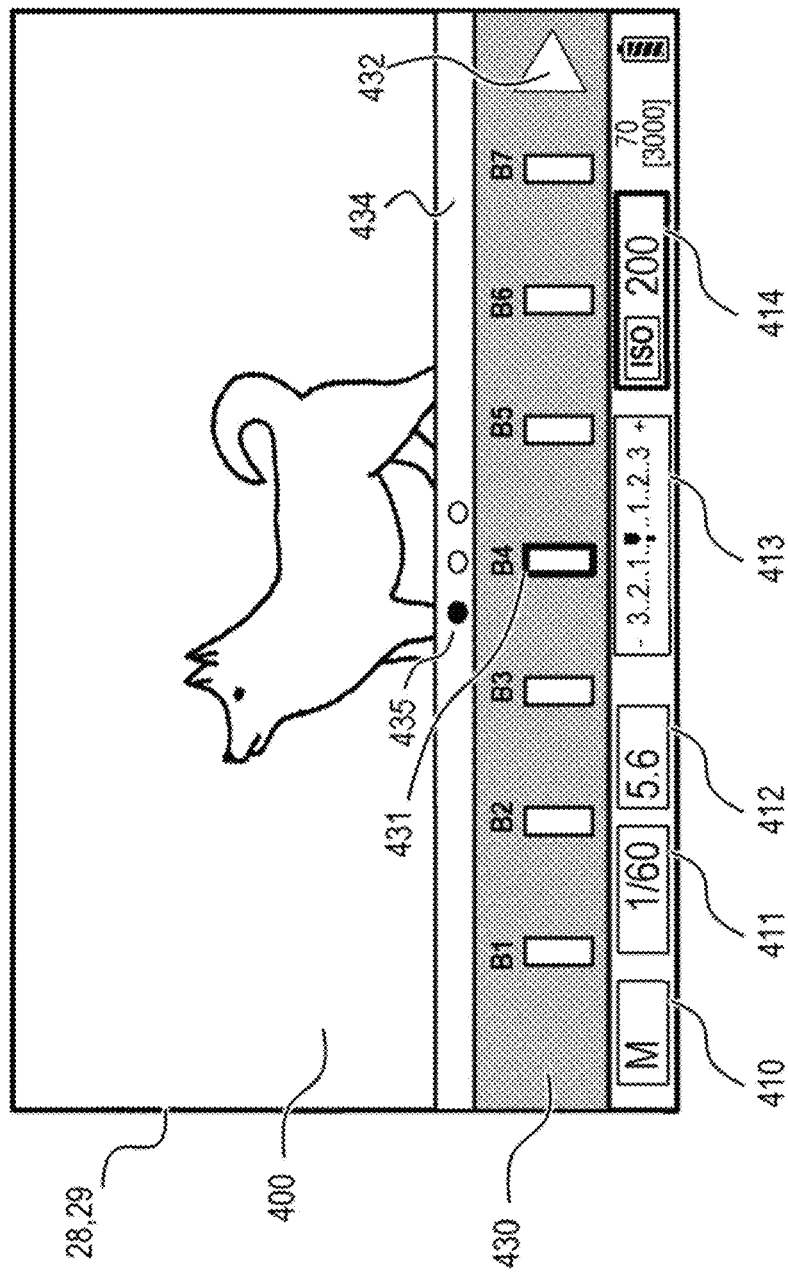

FIG. 4C shows a display example of the screen for line of sight. Display elements the same as those in FIG. 4A are denoted by the same reference numerals, and descriptions thereof will be omitted. In a setting option display region 430 for the line of sight input, some setting options (in the illustrated example, the setting options B1 to B7; the setting option group) among all setting options (for example, the setting options B1 to B20) that can be set for setting items are displayed. Also, the setting option displayed in S321 may be the same as or different from the setting option displayed in S302.

A cursor 431 is an identifier indicating that the setting option is selected from the plurality of setting options. The selection region fixed on the screen corresponding to the focus position 421 described above with reference to FIG. 4B is not displayed.

Unlike the center focus method, the cursor 431 moves to a position of the selected setting option in the setting option display region 430 for the line of sight input when the selected setting option is changed without scrolling the setting option row. The illustrated example is a setting screen for ISO sensitivity, in which the cursor 431 is displayed on the setting option B4 corresponding to the currently set ISO 200. All setting options (for example, the setting options B1 to B20) that can be set are separately displayed in multiple pages, the setting options B1 to B7 are displayed in a first page, the setting options B8 to B14 are displayed in a second page, and the setting options B15 to B20 are displayed in a third page.

A page guide region 434 shows a currently displayed page among all pages. Three circles that are page identification marks 435 indicate a total number of pages, and among them, a black circle indicates the currently displayed page. By looking at the black circle that is a page identifier, the user can recognize that the current page is the first page and can recognize that switching is possible to other two pages because there are two white circles. That is, the user can recognize that there are other setting options in addition to the currently displayed setting options B1 to B7.

A page switching item 432 is an instruction icon for giving an instruction to switch to the next page. In the illustrated example, the first page is displayed, and a switching item 433 (FIGS. 6C and 6D) for switching to the previous page is not displayed since there is no previous page, but it is displayed if there is a previous page.

In S322, the system control unit 50 determines whether or not the line of sight detection unit 160 has detected the line of sight of the user who looks at the EVF 29. If the line of sight detection unit 160 detects the line of sight, the system control unit 50 starts measuring a line of sight detection period and proceeds to S323, and otherwise proceeds to S329.

In S323, the system control unit 50 performs a focus display of an item corresponding to a line of sight detection position (a viewed point; a position of a visual point). The focus display is for indicating that a candidate may be selected by line of sight, and if a user continuously gazes at it, the user is preliminarily informed (notified) that the selection will be finally determined. The focus display may be displayed immediately when the line of sight is detected, and may be displayed under the condition that the line of sight is continuously detected at the same position for a specific time shorter than that of a gazing determination in S324, which will be described later. In a case in which the line of sight on any position of a plurality of setting options, switching items, and setting items 410 to 414 is detected, the focus display is displayed for the item (any of the plurality of setting options or setting items 410 to 414) at the viewed point.

In S324, the system control unit 50 determines whether or not there is gazing with the line of sight on the basis of the notification from the line of sight detection unit 160. The determination as to whether or not there is gazing is performed as follows. First, the system control unit 50 controls the gazing determination unit 170 such that whether or not there has been a change in the viewed point of the user is determined on the basis of detection information of the line of sight (line of sight input) received by the line of sight detection circuit 165 (line of sight detection unit 160). Also, the determination of the change in the viewed point may be not strict, and, for example, the system control unit 50 may determine that the viewed point has not changed when the options present in the viewed point of the user have not changed between a previous time and a current time. Further, this determination may be performed in accordance with a variation of movement of the viewed point in a short period, or the like. That is, if an average position of the viewed point in the short period is within a predetermined range and the variation is within a threshold, it may be determined that the viewed point has not changed. Then, in a case in which it is determined that the viewed point has not changed for a period longer than a gazing determination period TH after measurement for the line of sight detection period starts, it is determined that there is gazing, and the process proceeds to S325. On the other hand, in a case in which it is determined that the viewed point has changed before the gazing determination period TH is reached after the measurement for the line of sight detection period starts, it is determined that there is no gazing, and the process proceeds to S329. In the present embodiment, the gazing is an operation of selecting any one setting option from the displayed setting options or an operation of selecting a switching icon.

In S325, the system control unit 50 determines whether or not the viewed point at the time of determining that there is gazing is a position corresponding to any of the displayed plurality of setting options. If it is determined that the viewed point is the position of any of the setting options, the process proceeds to S326, and if not, the process proceeds to S327.

In S326, the system control unit 50 executes a function of the setting option (option) corresponding to the viewed point when it is determined that there is gazing. In this case, unlike S306, S310 and S311, the system control unit 50 does not change the display position of the setting option.

Figure 6A:
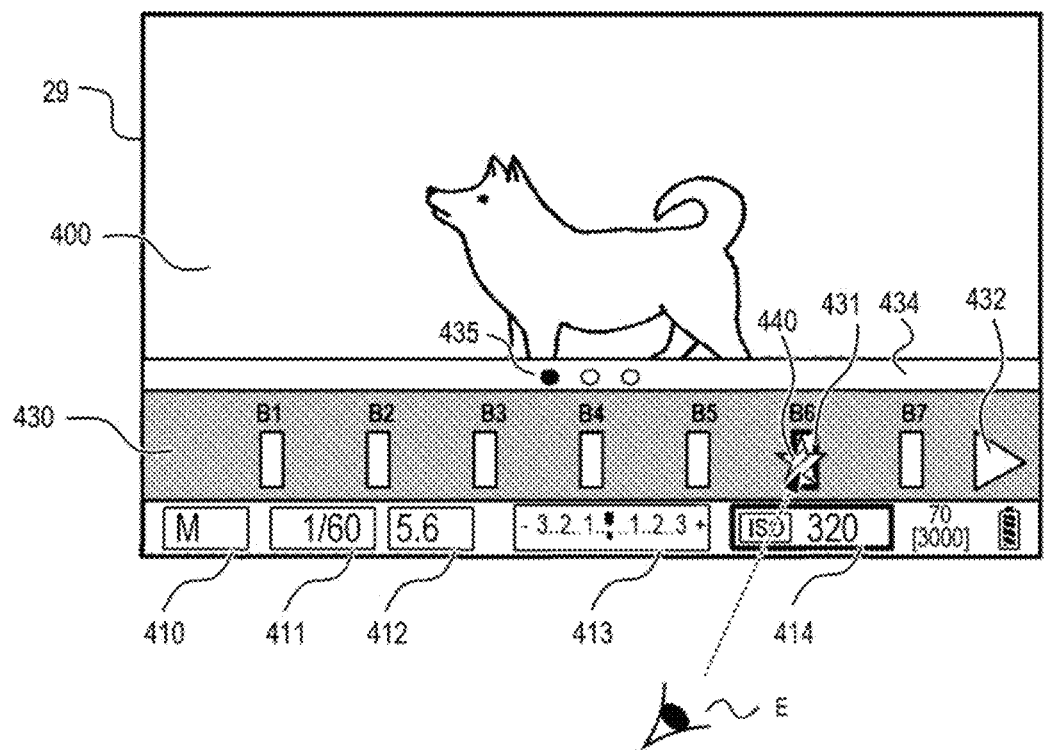
FIGS. 6A to 6D are screens for line of sight according to the first embodiment.

FIG. 6A shows a display example in S326. In a case in which the gazing at the position corresponding to the setting option B6 is detected from the state in which the screen of FIG. 4C is displayed, a display state of FIG. 6A is obtained. A position coordinate determined to have been gazed at by the user's eye E is a position 440. The cursor 431 is displayed at the position of the setting option B6 corresponding to the position 440 and indicates that the setting option B6 has been selected. For this reason, the function of the setting option B6 is executed, and in the example of FIG. 6A, ISO sensitivity of 320 corresponding to the setting option B6 is set. Along with that, the display content of the setting item 414 is updated with the content of the set ISO sensitivity and is recorded in the non-volatile memory 56. Also, types, the number, and positions of the displayed setting options do not change from the state of FIG. 4C before it is determined that there is gazing, and are in a state in which the setting options B1 to B7 are displayed. Since the display position of the setting option B6 that the user has gazed at does not change, by continuing to look at the position, the user can recognize that the selected option has been selected by the cursor 431, and good operability is obtained.

In S327, the system control unit 50 determines whether or not the viewed point at the time of determining that there is gazing corresponds to any of the displayed switching items (switching items 432 and 433). If it is determined that the viewed point is the position of any of the switching items, the process proceeds to S328, and if not, the process proceeds to S329.

Figure 6B:
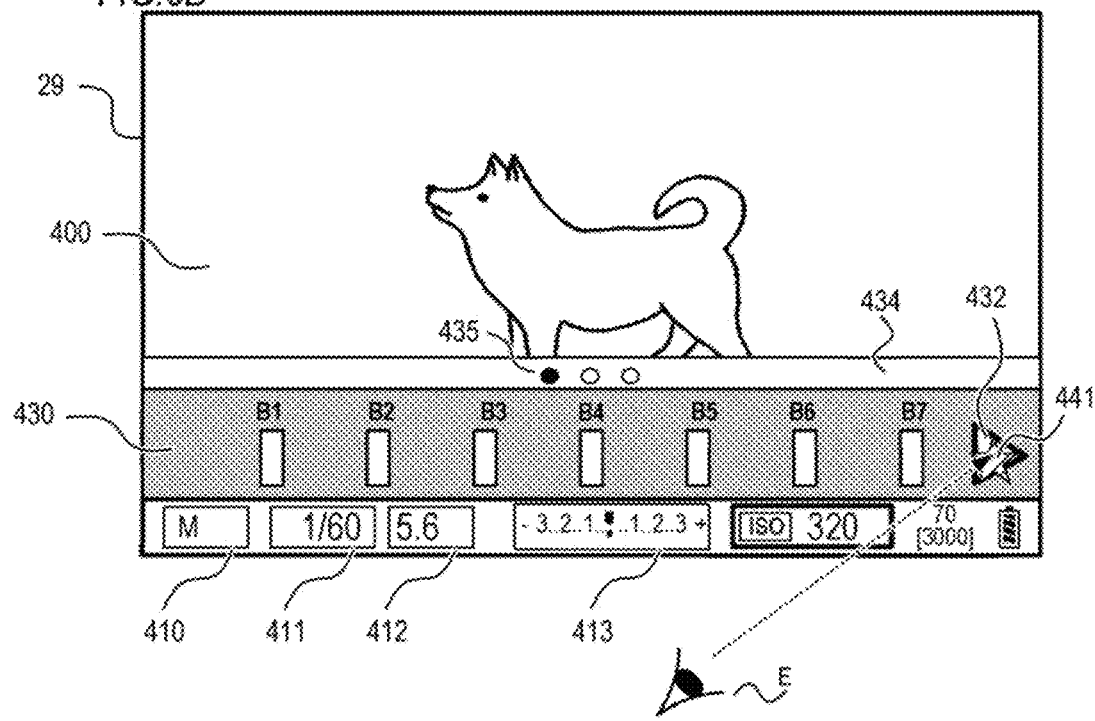
Figure 6C:
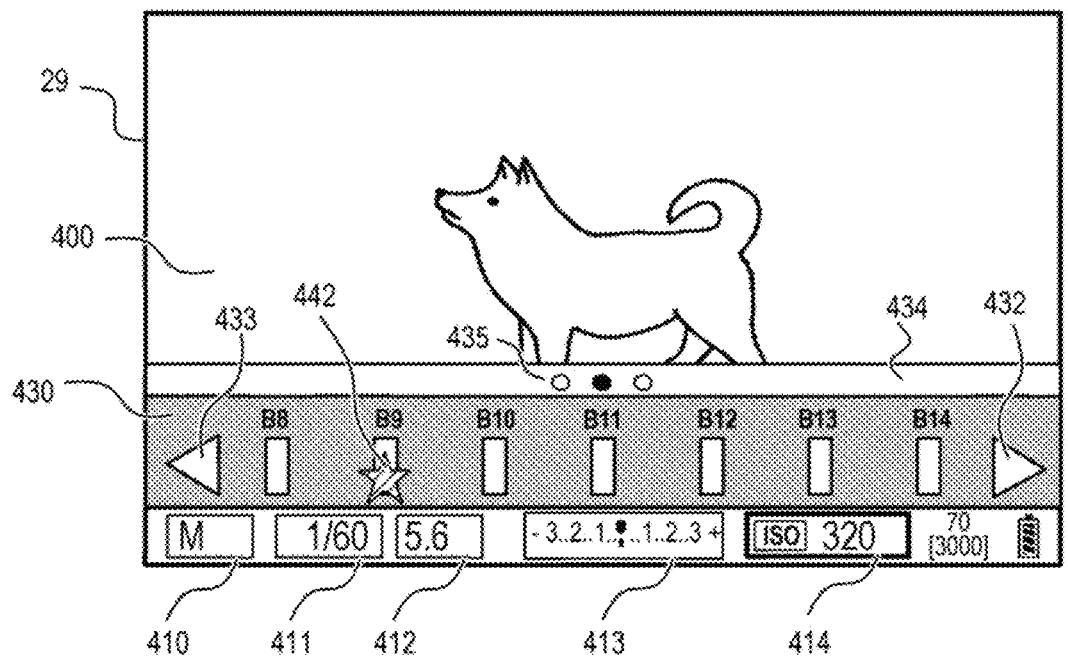
Figure 6D:
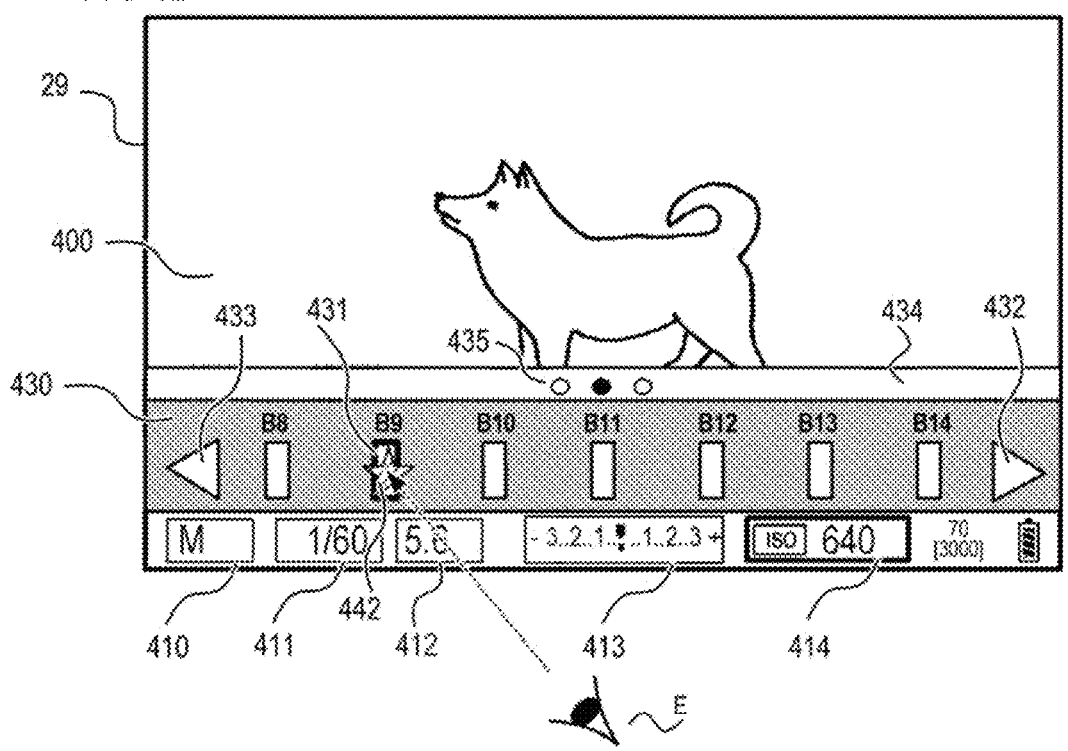

In S328, the system control unit 50 executes the function of the switching item corresponding to the position of the viewed point at the time of determining that there is gazing. That is, the system control unit 50 switches the displayed page of the setting options to either the next page or the previous page. FIGS. 6B and 6C show display examples in S328. In a case in which the gazing at the position corresponding to the switching item 432 is detected from the state in which the screen of FIG. 4C is displayed, the system control unit 50 switches a display of FIG. 6B to a display of FIG. 6C after performing the display of FIG. 6B for a short time of about several hundred milliseconds to 1 second. In FIG. 6B, since the gazing position is the position 441 and the cursor is displayed on the switching item 432 corresponding to the position 441, the user can recognize that the switching item 432 has been selected with the line of sight. Then, switching to the next page which is the function of the switching item 432 is performed, and the state of FIG. 6B in which the setting options B1 to B7 are displayed is switched to the state of FIG. 6C in which the setting options B8 to B14 are displayed. As described above, in S328, the system control unit 50 switches the display of the setting options on a page basis, and does not switch the display of the setting options on a sub-page basis. In a case in which the user finds a setting option to be set after the page is switched, the user gazes at the setting option so that contents of the gazed setting option can be set. For example, the user gazes at the position 442 in the state of FIG. 6C, so that the setting option B9 (corresponding to ISO 640) can be selected as shown in FIG. 6D, and the ISO sensitivity of the setting option B9 can be set. This process is performed by proceeding from S328 to S322, and then proceeding to S323 to S325 and S326.

In S329, the system control unit 50 determines whether or not the display destination has been changed. If there is an event for changing the display destination from the EVF 29 to the display unit 28 (detection of the eye separation or a switching operation of the display destination), the process proceeds to S301, and if not, the process proceeds to S330.

In S330, the system control unit 50 determines whether or not there is an end event of the selection screen process (turning power off, or an operation to close the selection screen, etc.). If there is the end event, the process ends, and if there is no end event, the process returns to S322.

Also, the operations on the operation members such as the button and the touch panel in S302 to S316 may be arbitrary operations as long as the operations are performed by the user touching (contacting) the operation members without using the line of sight. That is, when the screen for non-line of sight is displayed, a contact operation may be performed on any operation member (such as a button, a touch panel, a dial, and a 4-way key) that can receive a user's contact operation, and the setting option may be moved or selected in accordance with the operation. In this case, for example, a rotation operation of the dial may be performed instead of a touch-move, and an operation of pressing the button corresponding to the setting option may be performed instead of a touch-down.

Also, although the description on selection of the options in accordance with an operation on the button and the touch panel is omitted in the processes of the screens for line of sight of S321 to S330 in FIG. 3, the options can be selected by operating the button or the touch panel also in these cases.

According to the above processes, transitions of the display and operation methods are automatically switched between and provided for the case of using the line of sight input (S321 to S330) and the case of using the operations on the operation members such as the button and the touch panel which are operations other than the line of sight input (S302 to S316). This makes it possible to provide suitable visibility and operability for each of the case of selecting the option using the line of sight input and the case of selecting the option with the operations other than the line of sight input, regardless of the selected display destination and input method is selected.

Modified Example

Also, although an example in which the display method and the operation method of the center focus method are applied has been described in S302 to S316, another method may be used as a method of moving an option row by selecting an option. An applicable method instead of the center focus method of S302 to S316 will be described with reference to FIGS. 7A to 7E.

Figure 7A:
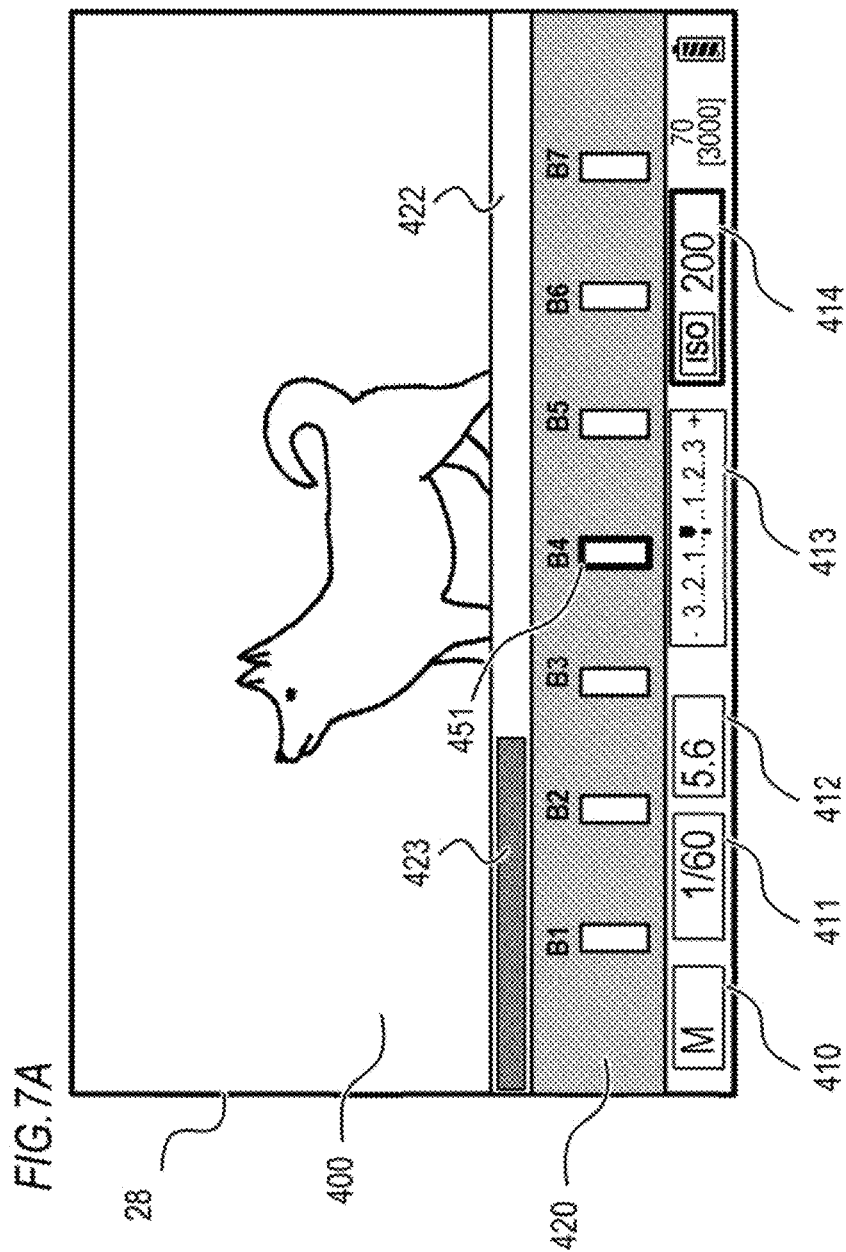
FIGS. 7A to 7E are selection screens according to a modified example.

FIG. 7A is a display example of the selection screen (screen for non-line of sight) on the current display destination (the display unit 28 or the EVF 29) for a case in which the line of sight input is not used. In FIG. 7A, display elements the same as those in FIG. 4B are denoted by the same reference numerals, and descriptions thereof will be omitted. A cursor 451 is displayed on the selected setting option and indicates that the setting option is currently selected. Unlike the center focus method, the cursor 451 is not displayed at a fixed position on the screen but is displayed at a position in accordance with the selected setting option.

Figure 7B:
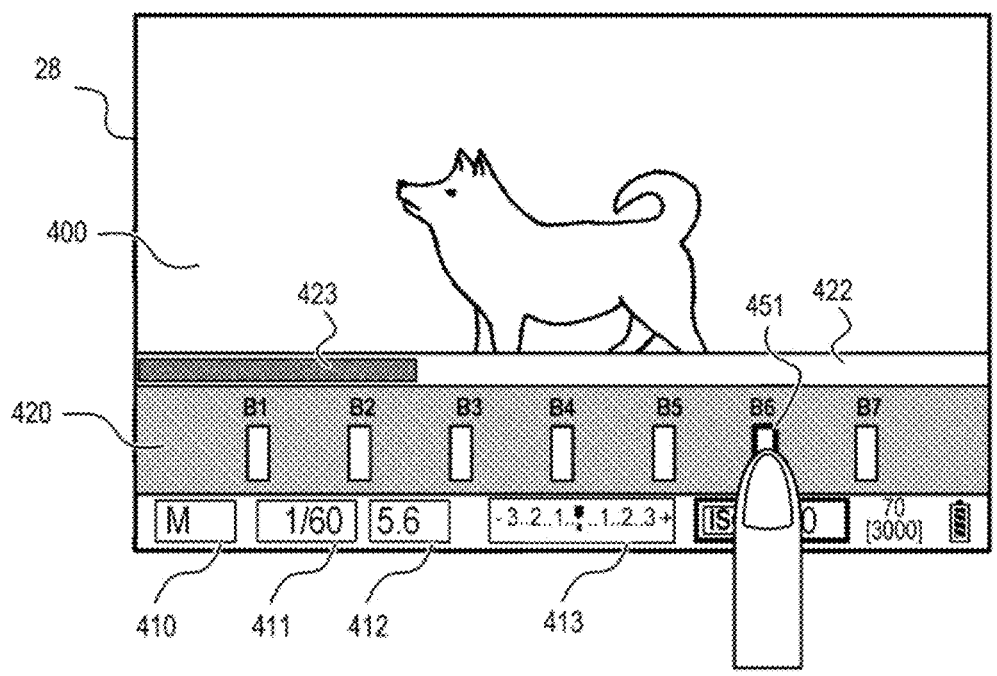
Figure 7C:
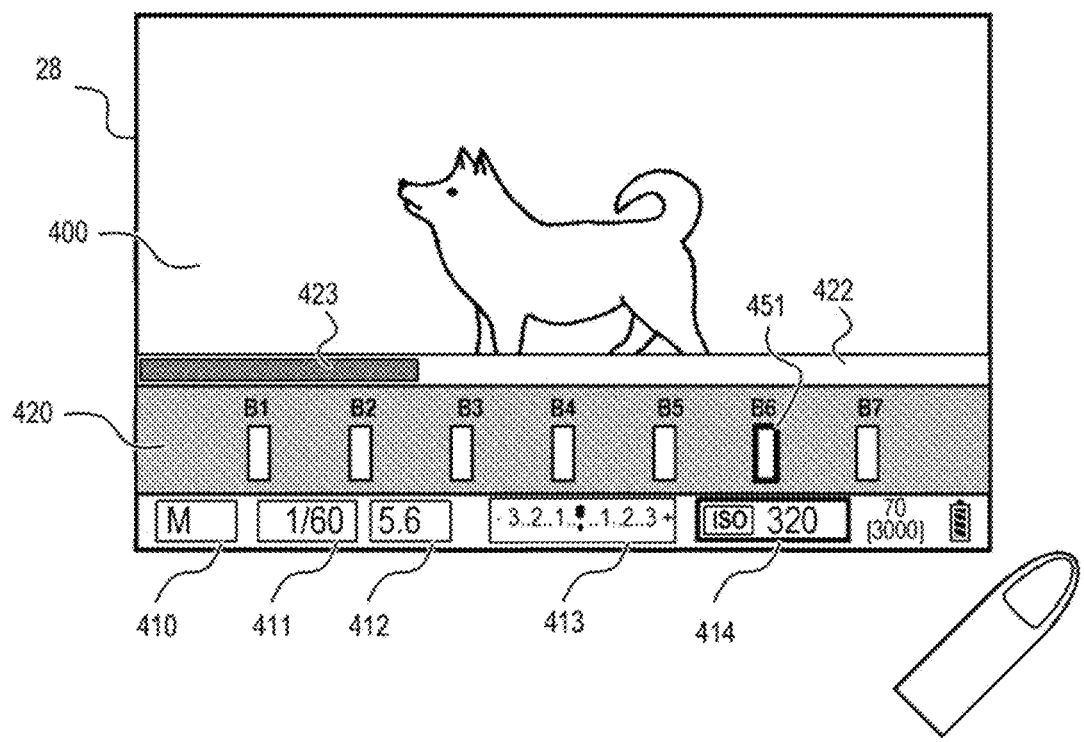

When there is a touch-down on the setting option B6 in the state of FIG. 7A, the display state of FIG. 7B is obtained, and the cursor 451 is displayed on the setting option B6. If a touch-up is detected without a touch-move in this state, the display state shown in FIG. 7C is obtained. In the display state shown in FIG. 7C, since the display is updated from ISO 200 to ISO 320 in the setting item 414, the user can see that the function of the setting option B6 has been executed. In this case, the display positions of the displayed setting options B1 to B7 are not changed. This is because the selected setting option B6 is not an item at an end (B1 or B7) of the displayed setting options B1 to B7, and thus the user can recognize that there is another setting option on a right or left side of the selected setting option. Further, a timing at which the function of the setting option B6 is executed may be the time when the touch-down on the setting option B6 is detected, or may be the time when a touch-up has been detected without a touch-move from the setting option B6.

Figure 7D:
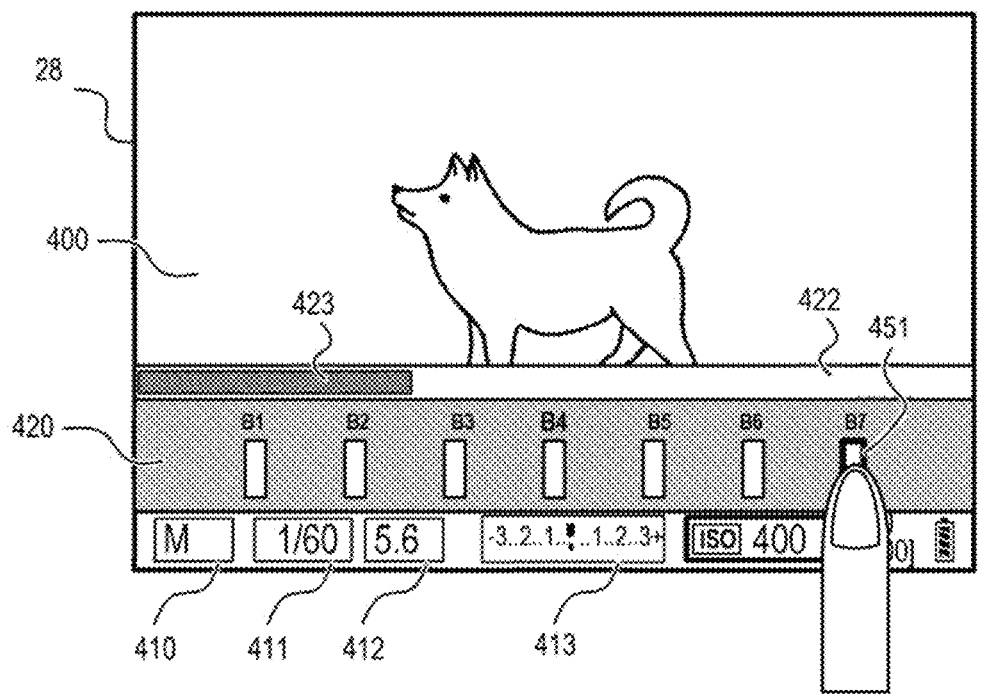
Figure 7E:
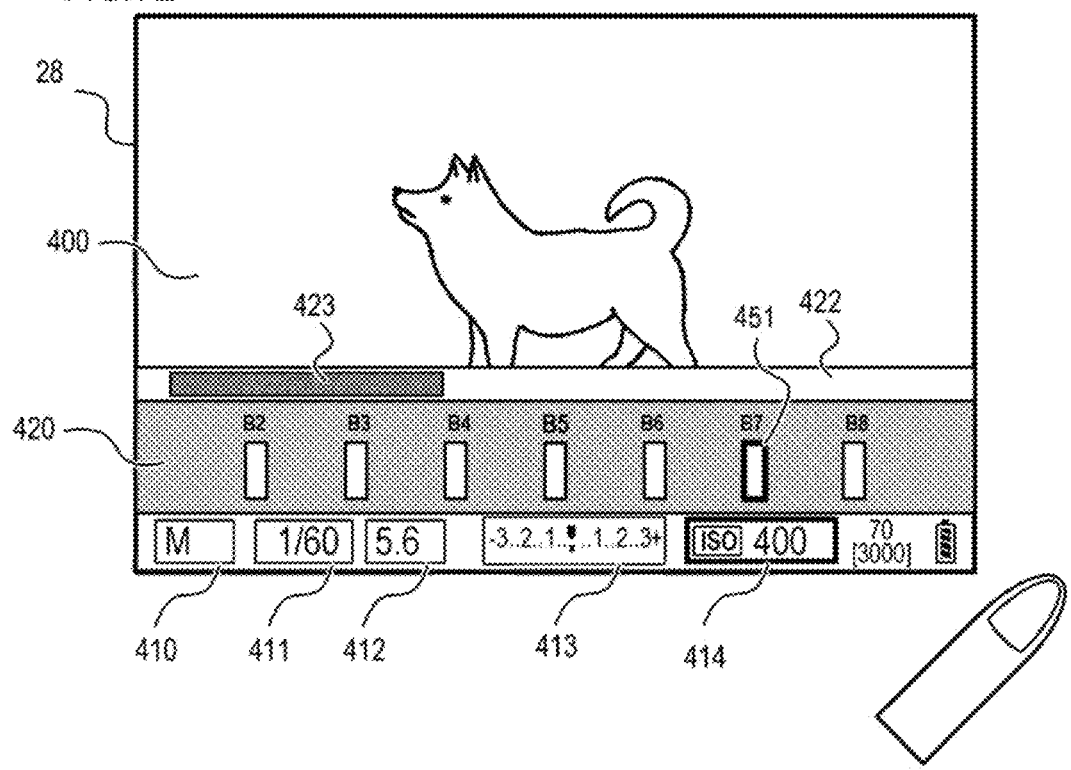

When there is a touch-down on the setting option B7 in the state of FIG. 7A, the display state of FIG. 7D is obtained, and the cursor 451 is displayed on the setting option B7. If a touch-up is detected without a touch-move in this state, the display state shown in FIG. 7E is obtained. In the display state shown in FIG. 7E, the display is updated from ISO 200 to ISO 400 in the setting item 414, and thus the user can recognize that the function of the setting option B7 has been executed. In this case, display positions of the displayed setting options B1 to B7 are moved to the left by one item (one unit of the setting options), and the displayed setting options are changed to B2 to B8. That is, the selected setting option B7 moves to come closer to the center of the setting option display region 420 by one unit of the setting options. This is because the selected setting option B7 is an item positioned at an extreme end of the setting options B1 to B7 displayed in the setting option display region 420, and there is a hidden setting option B8 adjacent thereto (on a hidden side from the end of the display region). That is, in the present modified example, the setting option is moved only in a case in which the selected setting option is the item positioned at the extreme end of the setting options displayed in the setting option display region 420 and there is a hidden setting option adjacent thereto. Also, an amount of movement of the setting option is not limited to one item, and movement may be by two items, for example.

In this way, the setting option row (an option row) is moved in accordance with a touch-up, and the setting option B8 that has not been displayed is newly displayed. This enables the user to recognize that there is a selectable setting option on the right side of the setting option row. Also, even in a case in which there is no hidden setting option B8, in order to make the user clearly recognize the absence, the selected setting option B7 may be moved to come closer to the center of the setting option display region 420 by one unit of the setting options. That is, in a case in which the selected setting option is positioned at the end of the setting option display region 420, the setting option may be moved. In other cases, the setting option may not be moved. Further, by not moving the setting option row (option row) during a touch-on, a deviation in position between a finger and the selected option does not occur, and thus the user does not become confused. In addition, a timing at which the function of the setting option B7 is executed may be the time when the touch-down on the setting option B7 is detected, or may be the time when a touch-up has been detected without a touch-move from the setting option B7.

As described above, in a case in which an operation on the operation member such as the button or the touch panel that is an operation other than that of a line of sight input is used, the display and selection method as described in FIGS. 7A to 7E may be applied, instead of the method of S302 to S316 described above. In a case in which the line of sight input is used, the display and selection method of S321 to S330 described above is applied.

The selection screen (selection screen for the ISO sensitivity) and the function of each option in the option row (setting of the ISO sensitivity) described above are merely examples, and the present invention is not limited thereto. A selection screen for the shutter speed is also applicable to a screen displaying options corresponding to selectable shutter speeds. Similarly, the present invention is applicable to selection screens such as an aperture setting value (F value), exposure correction, and photographing mode (options are a manual mode, a program mode, an aperture priority mode, a shutter speed priority mode, an auto mode, etc.). Also, the present invention can be applied to a display screen for the user to select from a plurality of options, without being limited to the photographing settings and any other setting items, and a situation in which all the options are not displayed on one screen and displayed options are switched therebetween for selection. For example, the present invention can be applied to a screen for selecting a filter effect (image quality adjustment) applied to an image, a screen for selecting any of a plurality of files and folders including documents, images, music, and the like as options, a screen for selecting any of a plurality of contact addresses and communication destinations as options, etc. As can be seen from the examples of these applicable screens and options, the present invention is not limited to cameras and is applicable to other applications. Further, although an example in which the screen for line of sight and the screen for non-line of sight display the same selection target items has been described, the screen for line of sight and on the screen for non-line of sight may display different selection target items.

Further, the switching between the screen for not-line of sight and the screen for line of sight can be performed on the basis of the determination as to whether or not a setting is a setting for using the line of sight input on the same display destination (image output destination) as described above in S320. This is not limited to cameras, and is applicable to cases in which the line of sight input is possible on, for example, a display screen of a personal computer (PC), a television, a head mounted display (HMD), or the like. That is, it is possible to switch between the screen for non-line of sight and the screen for line of sight on the basis of the determination as to whether or not a setting is a setting for using the line of sight input.

Also, as described above in S301, the screen for non-line of sight and the screen for line of sight can be switched on the basis of the determination as to whether the display destination (image output destination) can use the line of sight input or the display destination (image output destination) cannot use the line of sight input. In this case, the determination as to whether it is the setting using the line of sight input or not as described above in S320 may be omitted, and the display and selection method on the screen for line of sight may be used as long as it applies to a display destination in which the line of sight input is possible, regardless of the setting using the line of sight input. This is not limited to a camera (a finder and an external display), and can also be applied to, for example, a device (game machine, etc.) which can output videos with a television and a head mounted display (HMD) as display destinations. For example, the system control unit 50 may use the display and selection method of the screen for line of sight for an HMD in which the line of sight input is possible, and switches to the display and selection method of the screen for non-line of sight for a television in which the line of sight input is not possible.

Also, although the displayed option group has been described as one in which the options (setting options) are arranged in one row in the above description, the option group is not limited thereto. For example, the displayed option group may be arranged in one column, or the option group may be arranged two-dimensionally (for example, 3 rows×5 columns). Also in this case, for example, the system control unit 50 may perform control such that the option group is not moved in a case in which the option is selected using the line of sight input, and the selected option is moved and positioned at the center of the predetermined region in a case in which the option is selected using a touch operation.

According to the present invention, it is possible to display an operation screen with high operability on an electronic device in which an operation performed by a line of sight input and an operation on an operation unit can be received.

Also, the various controls described as being performed by the system control unit 50 may be performed by one piece of hardware, or a plurality of pieces of hardware (for example, a plurality of processors or circuits) may share the processes, thereby performing the control of the entire device.

Also, although the present invention has been described in detail on the basis of preferred embodiments, the present invention is not limited to these specific embodiments, and various aspects within the scope not departing from the gist of the present invention are also included in the present invention. Further, each of the embodiments described above is merely an example of the embodiments of the present invention, and each of the embodiments can be appropriately combined with others.

In addition, although the case in which the present invention is applied to a digital camera has been described as an example in the embodiment described above, the present invention is not limited to this example and is applicable to any electronic device in which an operation performed by a line of sight and an operation performed by a user's contact can be received. That is, the present invention can be applied to a personal computer, a PDA, a mobile phone terminal, a portable image viewer, a printer device including a display, a digital photo frame, a music player, a game machine, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140739, filed on Jul. 31, 2019, which is hereby incorporated by reference herein in its entirety.

What is claimed is:

1. An electronic device comprising:
an operation member; and
at least one memory and at least one processor which function as:
a receiving unit configured to receive a line of sight input by a user's line of sight, and
a control unit configured to perform control such that,
A) in case a first option group which includes a plurality of options is displayed in a state incapable of receiving option selection by the line of sight input, a) the first option group is moved, and b) a second option group that includes a plurality of options including one or more options included in the first option group and one or more options not included in the first option group is displayed, in accordance with an operation on the operation member for selecting any one option of the first option group, and
B) in case a third option group which includes a plurality of options is displayed in a state capable of receiving the option selection by the line of sight input, any one option of the third option group is selected without moving the third option group, in accordance with the line of sight input received by the receiving unit.

2. The electronic device according to claim 1, wherein the control unit is further configured to control such that a display unit which displays the first option group displays the third option group.

3. The electronic device according to claim 2,
wherein the state incapable of receiving the option selection by the line of sight input is a state in which the line of sight input is set to invalid, and
the state capable of receiving the option selection by the line of sight input is a state in which the line of sight input is set to valid.

4. The electronic device according to claim 1, wherein the control unit is further configured to control such that a display unit different from a display unit which displays the first option group displays the third option group.

5. The electronic device according to claim 4, wherein the control unit is further configured to determine whether there is in the state capable of receiving the option selection by the line of sight input or in the state incapable of receiving the option selection by the line of sight input, depending on a display unit displaying options among a plurality of display units.

6. The electronic device according to claim 1,
wherein the at least one memory and the at least one processor further function as a detection unit configured to detect user's eye proximity, and
the control unit is further configured to a) determine that there is in the state capable of receiving the option selection by the line of sight input in case the detection unit detects the eye proximity, and b) determine that there is in the state incapable of receiving the option selection by the line of sight input in case the detection unit does not detect the eye proximity.

7. The electronic device according to claim 1, wherein the first option group is an option group displayed in a predetermined region, and
the control unit is further configured to, in case the first option group is displayed in the state incapable of receiving the option selection by the line of sight input, change a display to position a selected option at a center of the predetermined region in accordance with the operation on the operation member for selecting any one option of the first option group.

8. The electronic device according to claim 1,
wherein the first option group is an option group displayed in a predetermined region, and
the control unit is further configured such that,
in case the first option group is displayed in the state incapable of receiving the option selection by the line of sight input, in accordance with the operation on the operation member for selecting any one option of the first option group,
the control unit changes a display such that a selected option becomes closer to a center of the predetermined region in case the selected option is positioned at a first position which is an end of an option group displayed in the predetermined region, and
the control unit does not change a position of the selected option in case the selected option is positioned at a second position which is not the end of the option group displayed in the predetermined region.

9. The electronic device according to claim 8, wherein the control unit is further configured to, in case the first option group is displayed in the state incapable of receiving the option selection by the line of sight input, in accordance with the operation on the operation member for selecting any one option of the first option group, changes the display such that the selected option becomes closer to the center of the predetermined region by one option unit in case the selected option is positioned at an extreme end of options in the predetermined region.

10. The electronic device according to claim 1, wherein the option selection by the line of sight input is performed by gazing at an option.

11. The electronic device according to claim 1, wherein the operation member is an operation member capable of being operated by user's contact.

12. The electronic device according to claim 1, wherein the operation member is any one of a button, a touch panel, a dial, and a four-way key.

13. The electronic device according to claim 1, wherein the first option group and the third option group are identical.

14. A non-transitory computer readable medium that stores a program for causing a computer to function as the units of the electronic device according to claim 1.

15. An electronic device comprising:
an operation member; and
at least one memory and at least one processor which function as:

a receiving unit configured to receive a line of sight input by a user's line of sight, and a control unit configured to perform control such that, A) in case a first option group which is a part of an option row including a plurality of options is displayed in a state incapable of receiving option selection by the line of sight input, by moving the option row by a movement amount of not more than one option unit in accordance with an operation on the operation member, a second option group a) which includes a plurality of options including one or more options included in the first option group and one or more options not included in the first option group and b) which is a part of the option row is displayed, and B) in case a first page including a third option group which includes a plurality of options is displayed in a state capable of receiving the option selection by the line of sight input, a) switching on a sub-page basis in accordance with the line of sight input received by the receiving unit is not performed, and b) the displayed page is switched to a second page including a fourth option group and not including options included in the third option group on a page basis in accordance with the line of sight input received by the receiving unit.

16. A non-transitory computer readable medium that stores a program for causing a computer to function as the units of the electronic device according to claim 15.

17. A method of controlling an electronic device including a receiving unit configured to receive a line of sight input by a user's line of sight and an operation member, the method comprising:

a first control step of performing control such that, in case a first option group which includes a plurality of options is displayed in a state incapable of receiving option selection by the line of sight input, a) the first option group is moved, and b) a second option group which includes a plurality of options including one or more options included in the first option group and one or more options not included in the first option group is displayed, in accordance with an operation on the operation member for selecting any one option of the first option group; and a second control step of performing control such that, in case a third option group which includes a plurality of options is displayed in a state capable of receiving the option selection by the line of sight input, any one option of the third option group is selected without moving the third option group, in accordance with the line of sight input received by the receiving unit.

18. A method of controlling an electronic device including a receiving unit configured to receive a line of sight input by a user's line of sight and an operation member, the method comprising:

a first control step of performing control such that, in case a first option group which is a part of an option row including a plurality of options is displayed in a state incapable of receiving option selection by the line of sight input, by moving the option row by a movement amount of not more than one option unit in accordance with an operation on the operation member, a second option group $\alpha$) which includes a plurality of options including one or more options included in the first option group and one or more options not included in the first option group and b) which is a part of the option row is displayed; and a second control step of performing control such that, in case a first page including a third option group which includes a plurality of options is displayed in a state capable of receiving the option selection by the line of sight input, a) switching on a sub-page basis in accordance with the line of sight input received by the receiving unit is not performed, and b) the displayed page is switched to a second page including a fourth option group and not including options included in the third option group on a page basis in accordance with the line of sight input received by the receiving unit.

* * * * *